US009612032B2

(12) United States Patent
Matas et al.

(10) Patent No.: US 9,612,032 B2
(45) Date of Patent: *Apr. 4, 2017

(54) USER FRIENDLY INTERFACE FOR CONTROL UNIT

(71) Applicant: Google Inc., Mountain View, CA (US)

(72) Inventors: Michael James Matas, San Francisco, AZ (US); David Sloo, Menlo Park, CA (US); Michael Plitkins, Berkeley, CA (US); Anthony Michael Fadell, Portola Valley, CA (US); Matthew Lee Rogers, Los Gatos, CA (US); John Benjamin Filson, Mountain View, CA (US); Brian Huppi, San Francisco, CA (US); Fred Bould, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/933,947

(22) Filed: Nov. 5, 2015

(65) Prior Publication Data

US 2016/0054022 A1 Feb. 25, 2016

Related U.S. Application Data

(63) Continuation of application No. 13/033,573, filed on Feb. 23, 2011, now Pat. No. 9,223,323.

(Continued)

(51) Int. Cl.

*F24F 11/00* (2006.01)
*G05B 15/02* (2006.01)

(Continued)

(52) U.S. Cl.

CPC ...... *F24F 11/0086* (2013.01); *B01D 46/0086* (2013.01); *F24D 19/10* (2013.01);

(Continued)

(58) Field of Classification Search

CPC .... F24F 11/0009; F24F 11/0034; F24F 11/02; F24F 11/006; F24F 11/001;

(Continued)

(56) References Cited

U.S. PATENT DOCUMENTS 2,558,648 A 6/1951 Warner
3,991,357 A 11/1976 Kaminski (Continued)

FOREIGN PATENT DOCUMENTS

CA 2202008 2/2000
DE 19609390 A1 9/1997

(Continued)

OTHER PUBLICATIONS

Advanced Model Owner's Manual, Bay Web Thermostat, manual [online], [retrieved on Nov. 7, 2012]. Retrieved from the Internet: <URL:http://www.bayweb.com/wp-content/uploads/BW-WT4-2DOC.pdf>, Oct. 6, 2011, 31 pages.

(Continued)

*Primary Examiner* — Charles Kasenge

(74) *Attorney, Agent, or Firm* — Kilpatrick Townsend & Stockton LLP

(57) ABSTRACT

A user-friendly programmable thermostat is described that includes a circular body having a large central display surrounded by a ring that can be rotated an pressed inward by a user so as to receive user input in a simple elegant fashion. Different colors can be displayed to the user to indicate currently active HVAC functions, and different shades of colors can be displayed to a user to indicate an estimated amount of time and/or energy for reaching a target temperature. The thermostat is wall mountable and is made up of a head unit removeably mounted to a backplate. A locking mechanism can be provided so as to increase security against unauthorized removal of the head unit. The (Continued)

ROTATE RING
500
512
514
516
75
508 backplate can be adapted to be mounted on a wall so as to be level, for example by including a bubble level on the backplate. One or more vents are preferably located on the sides of the body, such as in a gap beneath the translatably mounted ring, and/or in a gap between the head unit and the backplate. The target temperature for the device can be altered in response to sensing rotation of the rotating ring, and the programmed schedule can be displayed to and altered by the user in response to sensing rotation of the ring and the translational movement of the ring. Historical information such as temperature and cost information can be displayed to a user in response to sensing rotating of the rotating ring. One or more device settings can be displayed to and edited by a user in response to sensing rotating of the rotating member and the translational movement. According to some embodiments, text characters can be entered by the user.

20 Claims, 20 Drawing Sheets

Related U.S. Application Data

(60) Provisional application No. 61/429,093, filed on Dec. 31, 2010, provisional application No. 61/415,771, filed on Nov. 19, 2010.

(51) Int. Cl.

| | |
|---|---|
| ***F24F 11/02*** | (2006.01) |
| ***G05D 23/19*** | (2006.01) |
| ***F24D 19/10*** | (2006.01) |
| ***H04W 4/00*** | (2009.01) |
| ***B01D 46/00*** | (2006.01) |

(52) U.S. Cl.

CPC ........ *F24D 19/1084* (2013.01); *F24F 11/001* (2013.01); *F24F 11/006* (2013.01); *F24F 11/0009* (2013.01); *F24F 11/0012* (2013.01); *F24F 11/0034* (2013.01); *F24F 11/02* (2013.01); *G05B 15/02* (2013.01); *G05D 23/19* (2013.01); *G05D 23/1902* (2013.01); *G05D 23/1917* (2013.01); *H04W 4/005* (2013.01); *F24F 2011/0047* (2013.01); *F24F 2011/0052* (2013.01); *F24F 2011/0053* (2013.01); *F24F 2011/0057* (2013.01); *F24F 2011/0061* (2013.01); *F24F 2011/0063* (2013.01); *F24F 2011/0068* (2013.01); *F24F 2011/0073* (2013.01); *F24F 2011/0075* (2013.01); *F24F 2011/0091* (2013.01); *F24F 2011/0093* (2013.01); *F24F 2011/0094* (2013.01); *Y02B 10/20* (2013.01); *Y02B 10/70* (2013.01); *Y02B 60/50* (2013.01); *Y10T 29/49826* (2015.01)

(58) Field of Classification Search

CPC ............... F24F 11/0086; F24F 11/0012; F24F 2011/0061; F24F 2011/0053; F24F 2011/0047; F24F 2011/0057; F24F 2011/0063; F24F 2011/0075; F24F 2011/0094; F24F 2011/0091; F24F 2011/0052; F24F 2011/0093; F24F 2011/0068; F24F 2011/0073; G05B 15/02; B01D 46/0086; H04W 4/005; F24D 19/1084; F24D 19/10; G05D 23/19; G05D 23/1917; G05D 23/1902; Y02B 60/50; Y02B 10/20; Y02B 10/70; Y10T 29/49826

See application file for complete search history.

(56) References Cited

U.S. PATENT DOCUMENTS

| | | | |
|---|---|---|---|
| 4,223,831 | A | 9/1980 | Szarka |
| 4,316,577 | A | 2/1982 | Adams et al. |
| 4,335,847 | A | 6/1982 | Levine |
| 4,408,711 | A | 10/1983 | Levine |
| 4,613,139 | A | 9/1986 | Robinson, II |
| 4,615,380 | A | 10/1986 | Beckey |
| 4,621,336 | A | 11/1986 | Brown |
| 4,674,027 | A | 6/1987 | Beckey |
| 4,685,614 | A | 8/1987 | Levine |
| 4,751,961 | A | 6/1988 | Levine et al. |
| 4,768,706 | A | 9/1988 | Parfitt |
| 4,847,781 | A | 7/1989 | Brown, III et al. |
| 4,897,798 | A | 1/1990 | Cler |
| 4,971,136 | A | 11/1990 | Mathur et al. |
| 4,997,029 | A | 3/1991 | Otsuka et al. |
| 5,005,365 | A | 4/1991 | Lynch |
| D321,903 | S | 11/1991 | Chepaitis |
| 5,065,813 | A | 11/1991 | Berkeley et al. |
| 5,088,645 | A | 2/1992 | Bell |
| 5,115,967 | A | 5/1992 | Wedekind |
| 5,211,332 | A | 5/1993 | Adams |
| 5,224,648 | A | 7/1993 | Simon et al. |
| 5,224,649 | A | 7/1993 | Brown et al. |
| 5,240,178 | A | 8/1993 | Dewolf et al. |
| 5,244,146 | A | 9/1993 | Jefferson et al. |
| D341,848 | S | 11/1993 | Bigelow et al. |
| 5,294,047 | A | 3/1994 | Schwer et al. |
| 5,303,612 | A | 4/1994 | Odom et al. |
| 5,395,042 | A | 3/1995 | Riley et al. |
| 5,415,346 | A | 5/1995 | Bishop |
| 5,460,327 | A | 10/1995 | Hill et al. |
| 5,462,225 | A | 10/1995 | Massara et al. |
| 5,476,221 | A | 12/1995 | Seymour |
| 5,482,209 | A | 1/1996 | Cochran et al. |
| 5,485,954 | A | 1/1996 | Guy et al. |
| 5,499,196 | A | 3/1996 | Pacheco |
| 5,544,036 | A | 8/1996 | Brown, Jr. et al. |
| 5,555,927 | A | 9/1996 | Shah |
| 5,603,451 | A | 2/1997 | Helander et al. |
| 5,611,484 | A | 3/1997 | Uhrich |
| 5,627,531 | A | 5/1997 | Posso et al. |
| 5,673,850 | A | 10/1997 | Uptegraph |
| 5,761,083 | A | 6/1998 | Brown, Jr. et al. |
| D396,488 | S | 7/1998 | Kunkler |
| 5,779,143 | A | 7/1998 | Michaud et al. |
| 5,782,296 | A | 7/1998 | Mehta |
| 5,808,294 | A | 9/1998 | Neumann |
| 5,808,602 | A | 9/1998 | Sellers |
| 5,816,491 | A | 10/1998 | Berkeley et al. |
| 5,902,183 | A | 5/1999 | D'Souza |
| 5,909,378 | A | 6/1999 | De Milleville |
| 5,918,474 | A | 7/1999 | Khanpara et al. |
| 5,924,486 | A | 7/1999 | Ehlers et al. |
| 5,931,378 | A | 8/1999 | Schramm |
| 5,959,621 | A | 9/1999 | Nawaz et al. |
| 5,973,662 | A | 10/1999 | Singers et al. |
| 5,977,964 | A | 11/1999 | Williams et al. |
| 6,020,881 | A | 2/2000 | Naughton et al. |
| 6,032,867 | A | 3/2000 | Dushane et al. |
| 6,062,482 | A | 5/2000 | Gauthier et al. |
| 6,066,843 | A | 5/2000 | Scheremeta |
| D428,399 | S | 7/2000 | Kahn et al. |
| 6,095,427 | A | 8/2000 | Hoium et al. |
| 6,098,893 | A | 8/2000 | Berglund et al. |
| 6,122,603 | A | 9/2000 | Budike, Jr. |
| 6,164,374 | A | 12/2000 | Rhodes et al. |
| 6,206,295 | B1 | 3/2001 | LaCoste |
| 6,211,921 | B1 | 4/2001 | Cherian et al. |
| 6,213,404 | B1 | 4/2001 | Dushane et al. |
| 6,216,956 | B1 | 4/2001 | Ehlers et al. |

(56) References Cited

U.S. PATENT DOCUMENTS 6,286,764 B1 9/2001 Garvey et al.
6,298,285 B1 10/2001 Addink et al.
6,311,105 B1 10/2001 Budike, Jr.
D450,059 S 11/2001 Itou
6,318,639 B1 11/2001 Toth
6,349,883 B1 2/2002 Simmons et al.
6,351,693 B1 2/2002 Monie et al.
6,356,204 B1 3/2002 Guindi et al.
6,370,894 B1 4/2002 Thompson et al.
6,415,205 B1 7/2002 Myron et al.
6,453,687 B2 9/2002 Sharood et al.
D464,660 S 10/2002 Weng et al.
6,478,233 B1 11/2002 Shah
6,502,758 B2 1/2003 Cottrell
6,513,723 B1 2/2003 Mueller et al.
6,519,509 B1 2/2003 Nierlich et al.
D471,825 S 3/2003 Peabody
6,556,222 B1 * 4/2003 Narayanaswami .. G04G 9/0064 368/295
6,574,581 B1 6/2003 Bohrer et al.
6,595,430 B1 7/2003 Shah
6,619,055 B1 9/2003 Addy
6,622,925 B2 9/2003 Carner et al.
D480,401 S 10/2003 Kahn et al.
6,636,197 B1 10/2003 Goldenberg et al.
6,641,054 B2 11/2003 Morey
6,641,055 B1 11/2003 Tiernan
6,643,567 B2 11/2003 Kolk et al.
6,644,557 B1 11/2003 Jacobs
6,645,066 B2 11/2003 Gutta et al.
D485,279 S 1/2004 DeCombe
6,726,112 B1 4/2004 Ho
D491,956 S 6/2004 Ombao et al.
6,769,482 B2 8/2004 Wagner et al.
6,785,630 B2 8/2004 Kolk et al.
6,798,341 B1 9/2004 Eckel et al.
D497,617 S 10/2004 Decombe et al.
6,814,299 B1 11/2004 Carey
6,824,069 B2 11/2004 Rosen
6,851,621 B1 2/2005 Wacker et al.
6,864,879 B2 3/2005 Nojima et al.
D503,631 S 4/2005 Peabody
6,891,838 B1 5/2005 Petite et al.
6,909,921 B1 6/2005 Bilger
6,951,306 B2 10/2005 DeLuca
D511,527 S 11/2005 Hernandez et al.
6,975,958 B2 12/2005 Bohrer et al.
6,990,821 B2 1/2006 Singh et al.
7,000,849 B2 2/2006 Ashworth et al.
7,024,336 B2 4/2006 Salsbury et al.
7,028,912 B1 4/2006 Rosen
7,035,805 B1 4/2006 Miller
7,038,667 B1 5/2006 Vassallo et al.
7,055,759 B2 6/2006 Wacker et al.
7,083,109 B2 8/2006 Pouchak
7,108,194 B1 9/2006 Hankins, II
7,109,970 B1 9/2006 Miller
7,111,788 B2 9/2006 Reponen
7,114,554 B2 10/2006 Bergman et al.
7,135,965 B2 11/2006 Chapman, Jr. et al.
7,140,551 B2 11/2006 de Pauw et al.
7,141,748 B2 11/2006 Tanaka et al.
7,142,948 B2 11/2006 Metz
7,149,729 B2 12/2006 Kaasten et al.
7,152,806 B1 12/2006 Rosen
7,156,318 B1 1/2007 Rosen
7,159,789 B2 1/2007 Schwendinger et al.
7,159,790 B2 1/2007 Schwendinger et al.
7,181,317 B2 2/2007 Amundson et al.
7,188,482 B2 3/2007 Sadegh et al.
7,222,494 B2 5/2007 Peterson et al.
7,222,800 B2 5/2007 Wruck
7,225,054 B2 5/2007 Amundson et al.
D544,877 S 6/2007 Sasser
7,232,075 B1 * 6/2007 Rosen ................ G05D 23/1902 236/51
7,258,280 B2 8/2007 Wolfson
D550,691 S 9/2007 Hally et al.
7,264,175 B2 9/2007 Schwendinger et al.
7,274,972 B2 9/2007 Amundson et al.
7,287,709 B2 10/2007 Proffitt et al.
7,289,887 B2 10/2007 Rodgers
7,299,996 B2 11/2007 Garrett et al.
7,302,642 B2 11/2007 Smith et al.
7,333,880 B2 2/2008 Brewster et al.
7,346,467 B2 3/2008 Bohrer et al.
D566,587 S 4/2008 Rosen
7,379,791 B2 5/2008 Tamarkin et al.
RE40,437 E 7/2008 Rosen
7,418,663 B2 8/2008 Pettinati et al.
7,427,926 B2 9/2008 Sinclair et al.
7,434,742 B2 10/2008 Mueller et al.
7,451,937 B2 11/2008 Flood et al.
7,455,240 B2 11/2008 Chapman, Jr. et al.
7,460,690 B2 12/2008 Cohen et al.
7,469,550 B2 12/2008 Chapman, Jr. et al.
D588,152 S 3/2009 Okada
7,509,753 B2 3/2009 Nicosia et al.
D589,792 S 4/2009 Clabough et al.
D590,412 S 4/2009 Saft et al.
D593,120 S 5/2009 Bouchard et al.
7,537,171 B2 5/2009 Mueller et al.
D594,015 S 6/2009 Singh et al.
D595,309 S 6/2009 Sasaki et al.
7,555,364 B2 6/2009 Poth et al.
D596,194 S 7/2009 Vu et al.
D597,101 S 7/2009 Chaudhri et al.
7,558,648 B2 7/2009 Hoglund et al.
D598,463 S 8/2009 Hirsch et al.
7,571,014 B1 8/2009 Lambourne et al.
7,571,865 B2 8/2009 Nicodem et al.
7,575,179 B2 8/2009 Morrow et al.
D599,810 S 9/2009 Scalisi et al.
7,584,899 B2 9/2009 de Pauw et al.
7,600,694 B2 10/2009 Helt et al.
D603,277 S 11/2009 Clausen et al.
D603,421 S 11/2009 Ebeling et al.
D604,740 S 11/2009 Matheny et al.
7,614,567 B2 11/2009 Chapman et al.
7,620,996 B2 11/2009 Torres et al.
D607,001 S 12/2009 Ording
7,624,931 B2 12/2009 Chapman, Jr. et al.
7,634,504 B2 12/2009 Amundson
7,641,126 B2 1/2010 Schultz et al.
7,644,869 B2 1/2010 Hoglund et al.
7,667,163 B2 2/2010 Ashworth et al.
D613,301 S 4/2010 Lee et al.
D614,194 S 4/2010 Guntaur et al.
D614,196 S 4/2010 Guntaur et al.
7,693,582 B2 4/2010 Bergman et al.
7,702,424 B2 4/2010 Cannon et al.
7,703,694 B2 4/2010 Mueller et al.
D614,976 S 5/2010 Skafdrup et al.
D615,546 S 5/2010 Lundy et al.
D616,460 S 5/2010 Pearson et al.
7,721,209 B2 5/2010 Tilton
7,726,581 B2 6/2010 Naujok et al.
D619,613 S 7/2010 Dunn
7,784,704 B2 8/2010 Harter
7,802,618 B2 9/2010 Simon et al.
D625,325 S 10/2010 Vu et al.
D625,734 S 10/2010 Kurozumi et al.
D626,133 S 10/2010 Murphy et al.
7,823,076 B2 10/2010 Borovsky et al.
RE41,922 E 11/2010 Gough et al.
7,845,576 B2 12/2010 Siddaramanna et al.
7,848,900 B2 12/2010 Steinberg et al.
7,854,389 B2 12/2010 Ahmed
D630,649 S 1/2011 Tokunaga et al.
7,890,195 B2 2/2011 Bergman et al.
7,900,849 B2 3/2011 Barton et al.
7,904,209 B2 3/2011 Podgorny et al.
7,904,830 B2 3/2011 Hoglund et al.

(56) References Cited

U.S. PATENT DOCUMENTS 7,908,116 B2 3/2011 Steinberg et al.
7,908,117 B2 3/2011 Steinberg et al.
7,913,925 B2 3/2011 Ashworth
D638,835 S 5/2011 Akana et al.
D640,269 S 6/2011 Chen
D640,273 S 6/2011 Arnold et al.
D640,278 S 6/2011 Woo
D640,285 S 6/2011 Woo
D641,373 S 7/2011 Gardner et al.
7,984,384 B2 7/2011 Chaudhri et al.
D643,045 S 8/2011 Woo
8,010,237 B2 8/2011 Cheung et al.
8,019,567 B2 9/2011 Steinberg et al.
8,032,254 B2 * 10/2011 Amundson .......... F24F 11/0086 165/238
8,037,022 B2 10/2011 Rahman et al.
D648,735 S 11/2011 Arnold et al.
D651,529 S 1/2012 Mongell et al.
8,090,477 B1 1/2012 Steinberg
8,091,375 B2 1/2012 Crawford
8,091,794 B2 1/2012 Siddaramanna et al.
8,131,207 B2 3/2012 Hwang et al.
8,131,497 B2 3/2012 Steinberg et al.
8,131,506 B2 3/2012 Steinberg et al.
8,136,052 B2 3/2012 Shin et al.
D656,950 S 4/2012 Shallcross et al.
D656,952 S 4/2012 Weir et al.
8,156,060 B2 4/2012 Borzestowski et al.
8,166,395 B2 4/2012 Omi et al.
D658,674 S 5/2012 Shallcross et al.
8,180,492 B2 5/2012 Steinberg
8,185,164 B2 5/2012 Kim
8,195,313 B1 6/2012 Fadell et al.
D663,743 S 7/2012 Tanghe et al.
D663,744 S 7/2012 Tanghe et al.
D664,559 S 7/2012 Ismail et al.
8,219,249 B2 7/2012 Harrod et al.
8,223,134 B1 7/2012 Forstall et al.
8,234,581 B2 7/2012 Kake
D664,978 S 8/2012 Tanghe et al.
D665,397 S 8/2012 Naranjo et al.
8,243,017 B2 8/2012 Brodersen et al.
8,253,704 B2 8/2012 Jang
8,253,747 B2 8/2012 Niles et al.
8,280,536 B1 10/2012 Fadell et al.
8,281,244 B2 10/2012 Neuman et al.
D671,136 S 11/2012 Barnett et al.
8,316,022 B2 11/2012 Matsuda et al.
D673,171 S 12/2012 Peters et al.
D673,172 S 12/2012 Peters et al.
8,341,557 B2 12/2012 Pisula et al.
8,442,695 B2 5/2013 Imes et al.
8,489,243 B2 * 7/2013 Fadell .................. F24F 11/0009 236/1 C
8,706,270 B2 * 4/2014 Fadell .................. F24F 11/0009 700/17
2001/0052052 A1 12/2001 Peng
2002/0022991 A1 2/2002 Sharood et al.
2003/0034898 A1 2/2003 Shamoon et al.
2003/0042320 A1 3/2003 Decker
2003/0231001 A1 12/2003 Bruning
2004/0015504 A1 1/2004 Ahad et al.
2004/0055446 A1 3/2004 Robbin et al.
2004/0067731 A1 4/2004 Brinkerhoff et al.
2004/0074978 A1 4/2004 Rosen
2004/0095237 A1 5/2004 Chen et al.
2004/0164238 A1 8/2004 Xu et al.
2004/0249479 A1 12/2004 Shorrock
2004/0260427 A1 12/2004 Wimsatt
2004/0262410 A1 12/2004 Hull
2005/0040250 A1 2/2005 Wruck
2005/0043907 A1 2/2005 Eckel et al.
2005/0055432 A1 3/2005 Rodgers
2005/0071780 A1 3/2005 Muller et al.
2005/0090915 A1 4/2005 Geiwitz
2005/0103875 A1 5/2005 Ashworth et al.
2005/0119766 A1 6/2005 Amundson et al.
2005/0120181 A1 6/2005 Arunagirinathan et al.
2005/0128067 A1 6/2005 Zakrewski
2005/0150968 A1 7/2005 Shearer
2005/0189429 A1 9/2005 Breeden
2005/0192915 A1 9/2005 Ahmed et al.
2005/0194456 A1 9/2005 Tessier et al.
2005/0199737 A1 9/2005 De Pauw et al.
2005/0204997 A1 9/2005 Fournier
2005/0279840 A1 12/2005 Schwendinger et al.
2005/0279841 A1 12/2005 Schwendinger et al.
2005/0280421 A1 12/2005 Yomoda et al.
2006/0000919 A1 1/2006 Schwendinger et al.
2006/0186214 A1 8/2006 Simon et al.
2006/0196953 A1 9/2006 Simon et al.
2007/0045444 A1 3/2007 Gray et al.
2007/0057079 A1 3/2007 Stark et al.
2007/0114295 A1 5/2007 Jenkins
2007/0132503 A1 6/2007 Nordin
2007/0157639 A1 7/2007 Harrod
2007/0158444 A1 7/2007 Naujok et al.
2007/0220907 A1 9/2007 Ehlers
2007/0221741 A1 9/2007 Wagner et al.
2007/0246553 A1 10/2007 Morrow et al.
2007/0257120 A1 11/2007 Chapman, Jr. et al.
2007/0278320 A1 12/2007 Lunacek et al.
2007/0296280 A1 12/2007 Sorg et al.
2008/0006709 A1 1/2008 Ashworth et al.
2008/0015740 A1 1/2008 Osann
2008/0015742 A1 1/2008 Kulyk et al.
2008/0048046 A1 2/2008 Wagner et al.
2008/0099568 A1 5/2008 Nicodem et al.
2008/0155915 A1 7/2008 Howe et al.
2008/0191045 A1 8/2008 Harter
2008/0215240 A1 9/2008 Howard et al.
2008/0221737 A1 9/2008 Josephson et al.
2008/0273754 A1 11/2008 Hick et al.
2008/0317292 A1 12/2008 Baker et al.
2009/0001181 A1 1/2009 Siddaramanna et al.
2009/0099699 A1 4/2009 Steinberg et al.
2009/0125151 A1 5/2009 Steinberg et al.
2009/0127078 A1 5/2009 Hostmann et al.
2009/0140057 A1 6/2009 Leen
2009/0140060 A1 6/2009 Stoner et al.
2009/0140062 A1 6/2009 Amundson et al.
2009/0140064 A1 6/2009 Schultz et al.
2009/0143918 A1 6/2009 Amundson et al.
2009/0171862 A1 7/2009 Harrod et al.
2009/0194601 A1 8/2009 Flohr
2009/0254225 A1 10/2009 Boucher et al.
2009/0259713 A1 10/2009 Blumrich et al.
2009/0261174 A1 10/2009 Butler et al.
2009/0263773 A1 10/2009 Kotlyar et al.
2009/0273610 A1 11/2009 Busch et al.
2009/0297901 A1 12/2009 Kilian et al.
2009/0327354 A1 12/2009 Resnick et al.
2010/0019051 A1 1/2010 Rosen
2010/0025483 A1 2/2010 Hoeynck et al.
2010/0050004 A1 2/2010 Hamilton, II et al.
2010/0053464 A1 3/2010 Otsuka
2010/0070084 A1 3/2010 Steinberg et al.
2010/0070085 A1 3/2010 Harrod et al.
2010/0070086 A1 3/2010 Harrod et al.
2010/0070089 A1 * 3/2010 Harrod ................ F24F 11/0086 700/277
2010/0070093 A1 3/2010 Harrod et al.
2010/0070234 A1 3/2010 Steinberg et al.
2010/0070907 A1 3/2010 Harrod et al.
2010/0076605 A1 3/2010 Harrod et al.
2010/0076835 A1 3/2010 Silverman
2010/0084482 A1 4/2010 Kennedy et al.
2010/0106305 A1 4/2010 Pavlak et al.
2010/0107070 A1 4/2010 Devineni et al.
2010/0107076 A1 4/2010 Grohman et al.
2010/0107103 A1 4/2010 Wallaert et al.
2010/0163633 A1 7/2010 Barrett et al.
2010/0167783 A1 7/2010 Alameh et al.
2010/0168924 A1 7/2010 Tessier et al.

(56) References Cited

U.S. PATENT DOCUMENTS

| | | | |
|---|---|---|---|
| 2010/0179704 | A1 | 7/2010 | Ozog |
| 2010/0198425 | A1 | 8/2010 | Donovan |
| 2010/0211224 | A1 | 8/2010 | Keeling et al. |
| 2010/0262298 | A1 | 10/2010 | Johnson et al. |
| 2010/0262299 | A1 | 10/2010 | Cheung et al. |
| 2010/0280667 | A1 | 11/2010 | Steinberg |
| 2010/0282857 | A1 | 11/2010 | Steinberg |
| 2010/0289643 | A1 | 11/2010 | Trundle et al. |
| 2010/0308119 | A1 | 12/2010 | Steinberg et al. |
| 2011/0001812 | A1 | 1/2011 | Kang et al. |
| 2011/0015797 | A1 | 1/2011 | Gilstrap |
| 2011/0016017 | A1 | 1/2011 | Carlin et al. |
| 2011/0022242 | A1 | 1/2011 | Bukhin et al. |
| 2011/0046756 | A1 | 2/2011 | Park |
| 2011/0046792 | A1 | 2/2011 | Imes et al. |
| 2011/0046805 | A1 | 2/2011 | Bedros et al. |
| 2011/0046806 | A1 | 2/2011 | Nagel et al. |
| 2011/0054710 | A1 | 3/2011 | Imes et al. |
| 2011/0077758 | A1 | 3/2011 | Tran et al. |
| 2011/0077896 | A1 | 3/2011 | Steinberg et al. |
| 2011/0082594 | A1 | 4/2011 | Dage et al. |
| 2011/0106328 | A1 | 5/2011 | Zhou et al. |
| 2011/0151837 | A1 | 6/2011 | Winbush, III |
| 2011/0160913 | A1 | 6/2011 | Parker et al. |
| 2011/0166828 | A1 | 7/2011 | Steinberg et al. |
| 2011/0167369 | A1 | 7/2011 | van Os |
| 2011/0185895 | A1 | 8/2011 | Freen |
| 2011/0290893 | A1 | 12/2011 | Steinberg |
| 2011/0307103 | A1 | 12/2011 | Cheung et al. |
| 2011/0307112 | A1 | 12/2011 | Barrilleaux |
| 2012/0017611 | A1 | 1/2012 | Coffel et al. |
| 2012/0036250 | A1 | 2/2012 | Vaswani et al. |
| 2012/0053745 | A1 | 3/2012 | Ng |
| 2012/0065935 | A1 | 3/2012 | Steinberg et al. |
| 2012/0085831 | A1 | 4/2012 | Kopp |
| 2012/0086562 | A1 | 4/2012 | Steinberg |
| 2012/0089523 | A1 | 4/2012 | Hurri et al. |
| 2012/0130546 | A1 | 5/2012 | Matas et al. |
| 2012/0130547 | A1 | 5/2012 | Fadell et al. |
| 2012/0131504 | A1 | 5/2012 | Fadell et al. |
| 2012/0158350 | A1 | 6/2012 | Steinberg et al. |
| 2012/0179300 | A1 | 7/2012 | Warren et al. |
| 2012/0203379 | A1 | 8/2012 | Sloo et al. |
| 2012/0221151 | A1 | 8/2012 | Steinberg |
| 2012/0239207 | A1 | 9/2012 | Fadell et al. |
| 2013/0024799 | A1 | 1/2013 | Fadell et al. |
| 2013/0090767 | A1 | 4/2013 | Bruck et al. |
| 2013/0099011 | A1 | 4/2013 | Matsuoka et al. |

FOREIGN PATENT DOCUMENTS

| | | | |
|---|---|---|---|
| EP | 0207295 | | 1/1987 |
| EP | 0434926 | A2 | 7/1991 |
| EP | 0196069 | | 12/1991 |
| EP | 0720077 | A2 | 7/1996 |
| EP | 0802471 | A2 | 10/1997 |
| EP | 1065079 | A2 | 1/2001 |
| EP | 1184804 | B1 | 3/2002 |
| EP | 1731984 | A1 | 12/2006 |
| EP | 1283396 | B1 | 3/2007 |
| EP | 2157492 | A2 | 2/2010 |
| EP | 1703356 | B1 | 9/2011 |
| GB | 2212317 | B | 5/1992 |
| JP | 59106311 | A | 6/1984 |
| JP | 01252850 | | 10/1989 |
| JP | 09298780 | | 11/1997 |
| JP | 10023565 | | 1/1998 |
| JP | 2002087050 | A | 3/2002 |
| JP | 2003054290 | A | 2/2003 |
| JP | 2005224322 | A | 8/2005 |
| JP | 2007241203 | A | 9/2007 |
| JP | 2007305540 | A | 11/2007 |
| JP | 2008059796 | A | 3/2008 |
| JP | 2008230454 | A | 10/2008 |
| JP | 2009302004 | A | 12/2009 |
| KR | 1020070117874 | | 12/2007 |
| NL | 1024986 | C2 | 6/2005 |
| WO | 200248851 | A2 | 6/2002 |
| WO | 03017304 | A2 | 2/2003 |
| WO | 2005019740 | | 3/2005 |
| WO | 2008054938 | | 5/2008 |
| WO | 2009073496 | A2 | 6/2009 |
| WO | 2010033563 | | 3/2010 |
| WO | 2011128416 | A2 | 10/2011 |
| WO | 2011149600 | | 12/2011 |
| WO | 2012024534 | | 2/2012 |
| WO | 2013059671 | | 4/2013 |

OTHER PUBLICATIONS

Allen, et al., "Real-Time Earthquake Detection and Hazard Assessment by ElarmS Across California", Geophysical Research Letters, vol. 36, L00B08, 2009, pp. 1-6.

Ambient Devices Energy Joule Web Page, http://www.ambientdevices.com/products/energyjoule.html, 2 pages, Cambridge Massachusetts.

Aprilaire Electronic Thermostats Model 8355 User's Manual, Research Products Corporation, Dec. 2000, 16 pages.

Arens et al., "Demand Response Electrical Appliance Manager—User Interface Design, Development and Testing", Poster, Demand Response Enabling Technology Development, University of California Berkeley, Retrieved from dr.berkeley.edu/dream/posters/2005_6GUIposter.pdf, 2005, 1 page.

Arens et al., "Demand Response Enabled Thermostat—Control Strategies and Interface", Demand Response Enabling Technology Development Poster, University of California Berkeley, Retrieved from dr.berkeley.edu/dream/posters/2004_11CEC_TstatPoster.pdf, Jun. 2004, 1 page.

Arens et al., "Demand Response Enabling Technology Development", Phase I Report: Jun. 2003-Nov. 2005, P:/DemandRes/UC Papers/DR-Phase1Report-Final DraftApr. 24-26.doc, University of California Berkeley, pp. 1-108, Apr. 2006.

Auslander et al., "UC Berkeley DR Research Energy Management Group", Power Point Presentation, DR ETD Workshop, State of California Energy Commission, Jun. 11, 2007, pp. 1-35.

Bourke, Server Load Balancing, O'Reilly & Associates, Inc., Aug. 2001, 182 pages.

Braeburn Model 5300 Installer Guide, Braeburn Systems, LLC, Dec. 9, 2009, 10 pages.

Braeburn Model 5200, Braeburn Systems, LLC, Jul. 20, 2011, 11 pages.

Chen et al., "Demand Response-Enabled Residential Thermostat Controls", Abstract, ACEEE Summer Study on Energy Efficiency in Buildings, Mechanical Engineering Dept. and Architecture Dept., University of California Berkeley, Summer 2008, 48 pages.

De Almeida, et al., "Advanced Monitoring Technologies for the Evaluation of Demand-Side Management Programs", Energy, vol. 19, No. 6, 1994, pp. 661-678.

Deleeuw, "Ecobee WiFi Enabled Smart Thermostat Part 2: The Features Review", Retrieved from <URL: http://www.homenetworkenabled.com/content.php?136-ecobee-Wi Fi-enabled-Smart-Thermostat-Part-2-The-Features-review>, Dec. 2, 2011, 5 pages.

Ecobee Smart Si Thermostat Installation Manual, Ecobee, Apr. 3, 2012, 40 pages.

Ecobee Smart Si Thermostat User Manual, Ecobee, Apr. 3, 2012, 44 pages.

Ecobee Smart Thermostat Installation Manual, Jun. 29, 2011, 20 pages.

Ecobee Smart Thermostat User Manual, May 11, 2010, 20 pages.

Electric Heat Lock Out on Heat Pumps, Washington State University Extension Energy Program, Apr. 2010, pp. 1-3.

Energy Joule, Ambient Devices, 2011, [retrieved on Aug. 1, 2012]. Retrieved from: http://web.archive.org/web/20110723210421/http://www.ambientdevices.com/products/energyjoule.html, 3 pages.

Gao, et al., "The Self-Programming Thermostat: Optimizing Setback Schedules Based on Home Occupancy Patterns", In Proceed-

(56) References Cited

OTHER PUBLICATIONS ings of the First ACM Workshop on Embedded Sensing Systems for Energy-Efficiency in Buildings, Nov. 3, 2009, 6 pages.
Gevorkian, "Alternative Energy Systems in Building Design", 2009, pp. 195-200.
Green, "Thermo Heat Tech Cool", Popular Mechanics Electronic Thermostat Guide, Oct. 1985, pp. 155-158.
Hoffman, et al., "Integration of Remote Meter Reading, Load Control and Monitoring of Customers' Installations for Customer Automation with Telephone Line Signaling", Electricity Distribution, 1989. CIRED 1989. 10th International Conference on, May 8-12, 1989, pp. 421-424.
Honeywell CT2700, An Electronic Round Programmable Thermostat—User's Guide, Honeywell, Inc., 1997, 8 pages.
Honeywell CT8775A,C, The Digital Round Non-Programmable Thermostats—Owner's Guide, Honeywell International Inc., 2003, 20 pages.
Honeywell Installation Guide FocusPRO TH6000 Series, Honeywell International, Inc., Jan. 5, 2012, 24 pages.
Honeywell Operating Manual FocusPRO TH6000 Series, Honeywell International, Inc., Mar. 25, 2011, 80 pages.
Honeywell Prestige IAQ Product Data 2, Honeywell International, Inc., Jan. 12, 2012, 126 pages.
Honeywell Prestige THX9321 and TXH9421 Product Data, Honeywell International, Inc., 68-0311, Jan. 2012, 126 pages.
Honeywell Prestige THX9321-9421 Operating Manual, Honeywell International, Inc., Jul. 6, 2011, 120 pages.
Honeywell T8700C, An Electronic Round Programmable Thermostat—Owner's Guide, Honeywell, Inc., 1997, 12 pages.
Honeywell T8775 The Digital Round Thermostat, Honeywell, 2003, 2 pages.
Honeywell T8775AC Digital Round Thermostat Manual No. 69-1679EF-1, www.honeywell.com/yourhome, Jun. 2004, pp. 1-16.
Hunter Internet Thermostat Installation Guide, Hunter Fan Co., Aug. 14, 2012, 8 pages.
ICY B3815TT-001 Timer-Thermostat Package Box, ICY BV Product Bar Code No. 8717953007902, 2009, 2 pages.
Introducing the New Smart Si Thermostat, Datasheet [online]. Ecobee, No Date Given [retrieved on Feb. 25, 2013]. Retrieved from the Internet: <URL: https://www.ecobee.com/solutions/home/smart-si/>.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Levy, "A Vision of Demand Response—2016", The Electricity Journal, vol. 19, Issue 8, Oct. 2006, pp. 12-23.
Loisos, et al., "Buildings End-Use Energy Efficiency: Alternatives to Compressor Cooling", California Energy Commission, Public Interest Energy Research, Jan. 2000, 80 pages.
Lopes, "Case Studies in Advanced Thermostat Control for Demand Response", AEIC Load Research Conference, St. Louis, MO, Jul. 2004, 36 pages.
Lu, et al., "The Smart Thermostat: Using Occupancy Sensors to Save Energy in Homes", In Proceedings of the 8th ACM Conference on Embedded Networked Sensor Systems, Nov. 3-5, 2010, pp. 211-224.
Lux PSPU732T Manual, LUX Products Corporation, Jan. 6, 2009, 48 pages.
Martinez, "SCE Energy$mart Thermostat Program", Advanced Load Control Alliance, Oct. 5, 2004, 20 pages.
Matty, "Advanced Energy Management for Home Use", IEEE Transaction on Consumer Electronics, vol. 35, No. 3, Aug. 1989, pp. 584-588.
Meier et al., "Thermostat Interface Usability: A Survey", Ernest Orlando Lawrence Berkeley National Laboratory, Environmental Energy Technologies Division, Berkeley California., Sep. 2010, pp. 1-73.
Motegi, et al., "Introduction to Commercial Building Control Strategies and Techniques for Demand Response", Demand Response Research Center, May 22, 2007, 35 pages.
Mozer, "The Neural Network House: An Environmental that Adapts to it's Inhabitants", AAAI Technical Report SS-98-02, 1998, pp. 110-114.
NetX RP32-Wifi Network Thermostat Consumer Brochure, Network Thermostat, May 2011, 2 pages.
NetX RP32-Wifi Network Thermostat Specification Sheet, Network Thermostat, Feb. 28, 2012, 2 pages.
Peffer et al., "A Tale of Two Houses: The Human Dimension of Demand Response Enabling Technology from a Case Study of Adaptive Wireless Thermostat", Abstract, ACEEE Summer Study on Energy Efficiency in Buildings, Architecture Dept. and Mechanical Engineering Dept., University of California Berkeley., 2008, pp. 7-242 through 7-253.
Peffer et al., "Smart Comfort At Home: Design of a Residential Thermostat to Achieve Thermal Comfort, and Save Money and Peak Energy", University of California Berkeley, Mar. 2007, 1 page.
RobertShaw Product Manual 9620, Maple Chase Company, Jun. 12, 2001, 14 pages.
RobertShaw Product Manual 9825i2, Maple Chase Company, Jul. 17, 2006, 36 pages.
Salus, "S-Series Digital Thermostat Model No. ST620 Instruction Manual," Apr. 29, 2010, 24 pages, Version 005, www.salus-tech.com.
Sanford, "iPod (Click Wheel) (2004)", www.apple-history.com [retrieved on Apr. 9, 2012]. Retrieved from: http://apple-history.com/ipod, Apr. 9, 2012, 2 pages.
SCE Energy$mart Thermostat Study for Southern California Edison—Presentation of Study Results, Population Research Systems, Project #1010, Nov. 10, 2004, 51 pages.
SYSTXCCUIZ01-V Infinity Control Installation Instructions, Carrier Corp, May 31, 2012, 20 pages.
T8611G Chronotherm IV Deluxe Programmable Heat Pump Thermostat Product Data, Honeywell International Inc., Oct. 1997, 24 pages.
TB-PAC, TB-PHP, Base Series Programmable Thermostats, Carrier Corp, May 14, 2012, 8 pages.
The Clever Thermostat User Manual and Installation Guide, ICY BV ICY3815 Timer-Thermostat, 2009, pp. 1-36.
The Clever Thermostat, ICY BV Web Page, http://www.icy.nl/en/consumer/products/clever-thermostat, ICY BV, 2012, 1 page.
The Perfect Climate Comfort Center PC8900A W8900A-C Product Data Sheet, Honeywell International Inc, Apr. 2001, 44 pages.
TP-PAC, TP-PHP, TP-NAC, TP-NHP Performance Series AC/HP Thermostat Installation Instructions, Carrier Corp, Sep. 2007, 56 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
U.S. Appl. No. 60/512,886, Volkswagen Rotary Knob for Motor Vehicle—English Translation of German Application filed Oct. 20, 2003.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat, Honeywell International, Inc. Operating Manual, Aug. 2012, 48 pages.
White et al., "A Conceptual Model for Simulation Load Balancing", Proc. 1998 Spring Simulation Interoperability Workshop, 1998, 7 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.

(56) References Cited

OTHER PUBLICATIONS

Wright et al., "DR ETD—Summary of New Thermostat, TempNode, & New Meter (UC Berkeley Project)", Power Point Presentation, Public Interest Energy Research, University of California Berkeley. Retrieved from: http://dr.berkeley.edu/dream/presentations/2005_6CEC.pdf, 2005, pp. 1-49.
Ep Application No. 11842181.7, filed Nov. 18, 2011, Office Action mailed Mar. 7, 2016, all pages.
CN Application No. 201180055675.0, filed Nov. 18, 2011, Office Action mailed May 30, 2016, all pages.
JP Application No. 2013-540067, filed Nov. 18, 2011, Office Action mailed Jun. 28, 2016, all pages.

* cited by examiner

ROTATE RING CLOCKWISE

ROTATE RING
COUNTER-CLOCKWISE

INWARD CLICK

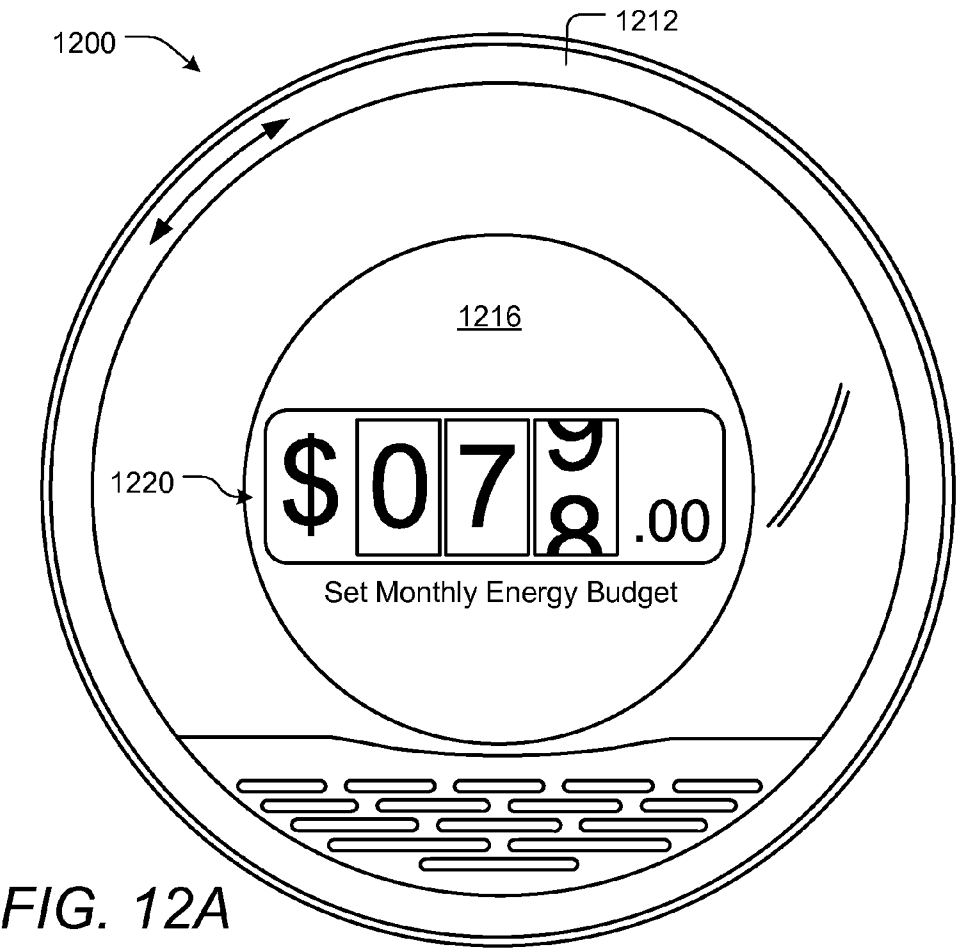
FIG. 12A
1222
FIG. 12B
9 4 0 1 0 0
Enter U.S. ZIP CODE
1224
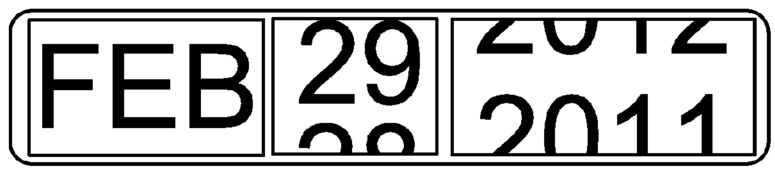
Enter Date
FIG. 12C

USER FRIENDLY INTERFACE FOR CONTROL UNIT

CROSS-REFERENCE TO RELATED APPLICATIONS

This patent application is a continuation of U.S. Ser. No. 13/033,573 filed Feb. 23, 2011, which claims the benefit of U.S. Prov. Ser. No. 61/415,771 filed Nov. 19, 2010; and of U.S. Prov. Ser. No. 61/429,093 filed Dec. 31, 2010. The subject matter of this patent specification also relates to the subject matter of the following commonly assigned applications: U.S. Ser. No. 12/881,430 filed Sep. 14, 2010; U.S. Ser. No. 12/881,463 filed Sep. 14, 2010; U.S. Ser. No. 12/984,602 filed Jan. 4, 2011; and U.S. Ser. No. 12/987,257 filed Jan. 10, 2011. Each of the above-referenced patent applications is hereby incorporated by reference in its entirety.

COPYRIGHT AUTHORIZATION

A portion of the disclosure of this patent document may contain material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This invention relates generally to the control of HVAC systems. More particularly, embodiments of this invention relate to user interfaces for thermostats, other HVAC controlling systems, and/or for other systems for controlling household utilities, resources or other systems.

While substantial effort and attention continues toward the development of newer and more sustainable energy supplies, the conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment. By activating heating, ventilation, and air conditioning (HVAC) equipment for judiciously selected time intervals and carefully chosen operating levels, substantial energy can be saved while at the same time keeping the living space suitably comfortable for its occupants.

Historically, however, most known HVAC thermostatic control systems have tended to fall into one of two opposing categories, neither of which is believed be optimal in most practical home environments. In a first category are many simple, non-programmable home thermostats, each typically consisting of a single mechanical or electrical dial for setting a desired temperature and a single HEAT-FAN-OFF-AC switch. While being easy to use for even the most unsophisticated occupant, any energy-saving control activity, such as adjusting the nighttime temperature or turning off all heating/cooling just before departing the home, must be performed manually by the user. As such, substantial energy-saving opportunities are often missed for all but the most vigilant users. Moreover, more advanced energy-saving settings are not provided, such as the ability to specify a custom temperature swing, i.e., the difference between the desired set temperature and actual current temperature (such as 1 to 3 degrees) required to trigger turn-on of the heating/cooling unit.

In a second category, on the other hand, are many programmable thermostats, which have become more prevalent in recent years in view of Energy Star (US) and TCO (Europe) standards, and which have progressed considerably in the number of different settings for an HVAC system that can be individually manipulated. Unfortunately, however, users are often intimidated by a dizzying array of switches and controls laid out in various configurations on the face of the thermostat or behind a panel door on the thermostat, and seldom adjust the manufacturer defaults to optimize their own energy usage. Thus, even though the installed programmable thermostats in a large number of homes are technologically capable of operating the HVAC equipment with energy-saving profiles, it is often the case that only the one-size-fits-all manufacturer default profiles are ever implemented in a large number of homes. Indeed, in an unfortunately large number of cases, a home user may permanently operate the unit in a "temporary" or "hold" mode, manually manipulating the displayed set temperature as if the unit were a simple, non-programmable thermostat. Thus, there is a need for a thermostat having an improved user interface that is simple, intuitive and easy to use such that the typical user is able to access many of the features such as programming energy-saving profiles.

At a more general level, because of the fact that human beings must inevitably be involved, there is a tension that arises between (i) the amount of energy-saving sophistication that can be offered by an HVAC control system, and (ii) the extent to which that energy-saving sophistication can be put to practical, everyday use in a large number of homes. Similar issues arise in the context of multi-unit apartment buildings, hotels, retail stores, office buildings, industrial buildings, and more generally any living space or work space having one or more HVAC systems. Other issues arise as would be apparent to one skilled in the art upon reading the present disclosure.

SUMMARY

According to some embodiments a programmable device for controlling an HVAC system is provided. The device is preferably a programmable thermostat and includes a rounded body; a rounded display mounted on the body and adapted to display information to a user; a rotating ring mounted on the body and adapted to receive user input; and a processing system adapted to control one or more HVAC functions according to a scheduled program, to display information on the rounded display and to receive user input from the rotating ring. According to some embodiments the body, display and ring are circular in shape, and the display is a dot matrix display using a display technology such as passive LCD, monochrome LCD, color LCD, organic light-emitting diode, or electronic ink. According to some embodiments different colors are displayed to the user to indicate currently active HVAC functions, and different shades of colors are displayed to a user to indicate an estimated amount of time and/or energy for reaching a target temperature.

According to some embodiments, the rounded body forms part of a head unit, and the device also includes a backplate adapted to be mounted on a wall. The head unit can be removeably mounted to the backplate, and a locking mechanism can be provided for locking the head unit to the back plate so as to increase security against unauthorized removal of the head unit. The backplate can be adapted to be mounted on a wall so as to be level, for example by including a bubble level on the backplate.

According to some embodiments, the rotating ring is mounted so as to be translatably moveable in a direction towards the base of the device so as to receive user input. One or more vents are preferably located on the sides of the body, such as in a gap beneath the translatably mounted ring, and/or in a gap between the head unit and the backplate.

According to some embodiments a method for interacting with a user with a programmable device for controlling an HVAC system is provided. The method includes displaying information to a user on a rounded dot-matrix display mounted on a rounded body of the programmable device; and receiving input from a user at least in part using rotating member mounted on the body and by sensing a translational movement of the rotating member toward the base of the device. The rotating member is preferably a rotating ring surrounding the rounded display. The device can be mounted on a wall on the base of the device.

According to some embodiments, the target temperature for the device can be altered in response to sensing rotation of the rotating ring, and the programmed schedule can be displayed to and altered by the user in response to sensing rotation of the ring and the translational movement of the ring. Historical information such as temperature and cost information can be displayed to a user in response to sensing rotating of the rotating ring. One or more device settings are displayed to and editable by a user in response to sensing rotating of the rotating member and the translational movement. According to some embodiments, text characters are received from a user using the rotating member and the translational movement.

According to some embodiments, a thermostat for controlling at least one HVAC function in an HVAC system is provided. The thermostat includes a back plate and a head unit. The back plate includes connectors adapted to connect to HVAC control wires, and a back plate processor adapted and programmed so as to turn on and turn off the HVAC function. The head unit includes a display adapted to display information to a user, a user input device for receiving input from a user, and a head unit processor adapted and programmed to control the display and processing received user input. The head unit and back plate are adapted to physically attach to each other so as to provide electrical connection between the head unit and back plate. According to some embodiments, the back plate is wall mountable and can include a temperature sensor. According to some embodiments, the back plate can maintain a set temperature when the head unit is not attached to the back plate. According to some embodiments, the back plate can control the HVAC system according to a series of programmed settings that take effect at different times of the day, when the head unit is not attached to the back plate. According to some embodiments the head unit also includes a rechargeable battery, and/or a wireless communication system. According to some embodiments, the head unit can update a thermodynamic model relating to an enclosure in which the HVAC system is installed.

As used herein the term "HVAC" includes systems providing both heating and cooling, heating only, cooling only, as well as systems that provide other occupant comfort and/or conditioning functionality such as humidification, dehumidification and ventilation.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "thermostat" means a device or system for regulating parameters such as temperature and/or humidity within at least a part of an enclosure. The term "thermostat" may include a control unit for a heating and/or cooling system or a component part of a heater or air conditioner.

It will be appreciated that these systems and methods are novel, as are applications thereof and many of the components, systems, methods and algorithms employed and included therein. It should be appreciated that embodiments of the presently described inventive body of work can be implemented in numerous ways, including as processes, apparata, systems, devices, methods, computer readable media, computational algorithms, embedded or distributed software and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which:

FIGS. 12A-C illustrate aspects of a thermostat user interface, according to some embodiments;

DETAILED DESCRIPTION

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

Figure 1:
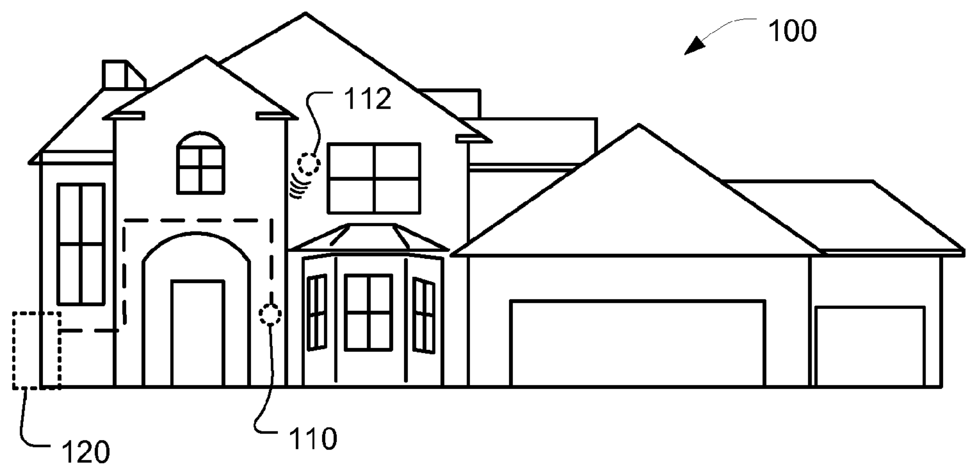
FIG. 1 is a diagram of an enclosure in which environmental conditions are controlled, according to some embodiments.

FIG. 1 is a diagram of an enclosure in which environmental conditions are controlled, according to some embodiments. Enclosure 100, in this example is a single-family dwelling. According to other embodiments, the enclosure can be, for example, a duplex, an apartment within an apartment building, a light commercial structure such as an office or retail store, or a structure or enclosure that is a combination of the above. Thermostat 110 controls HVAC system 120 as will be described in further detail below. According to some embodiments, the HVAC system 120 is has a cooling capacity less than about 5 tons. According to some embodiments, a remote device 112 wirelessly communicates with the thermostat 110 and can be used to display information to a user and to receive user input from the remote location of the device 112. According to some embodiments, the device 112 can be located outside of the enclosure 100.

Figure 2:
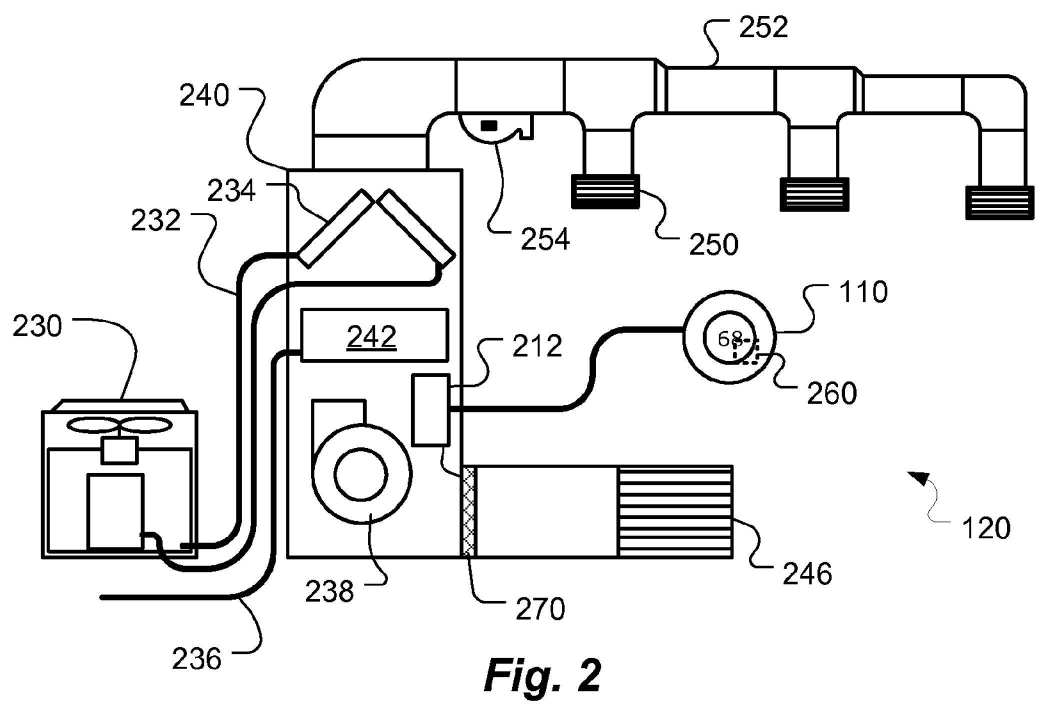
FIG. 2 is a diagram of an HVAC system, according to some embodiments.

FIG. 2 is a diagram of an HVAC system, according to some embodiments. HVAC system 120 provides heating, cooling, ventilation, and/or air handling for the enclosure, such as a single-family home 100 depicted in FIG. 1. The system 120 depicts a forced air type heating system, although according to other embodiments, other types of systems could be used. In heating, heating coils or elements 242 within air handler 240 provide a source of heat using electricity or gas via line 236. Cool air is drawn from the enclosure via return air duct 246 through filter 270, using fan 238 and is heated heating coils or elements 242. The heated air flows back into the enclosure at one or more locations via supply air duct system 252 and supply air grills such as grill 250. In cooling an outside compressor 230 passes gas such a Freon through a set of heat exchanger coils to cool the gas. The gas then goes to the cooling coils 234 in the air handlers 240 where it expands, cools and cools the air being circulated through the enclosure via fan 238. According to some embodiments a humidifier 254 is also provided. Although not shown in FIG. 2, according to some embodiments the HVAC system has other known functionality such as venting air to and from the outside, and one or more dampers to control airflow within the duct systems. The system is controlled by algorithms implemented via control electronics 212 that communicate with a thermostat 110. Thermostat 110 controls the HVAC system 120 through a number of control circuits. Thermostat 110 also includes a processing system 260 such as a microprocessor that is adapted and programmed to controlling the HVAC system and to carry out the techniques described in detail herein.

Figures 3A, 3B:
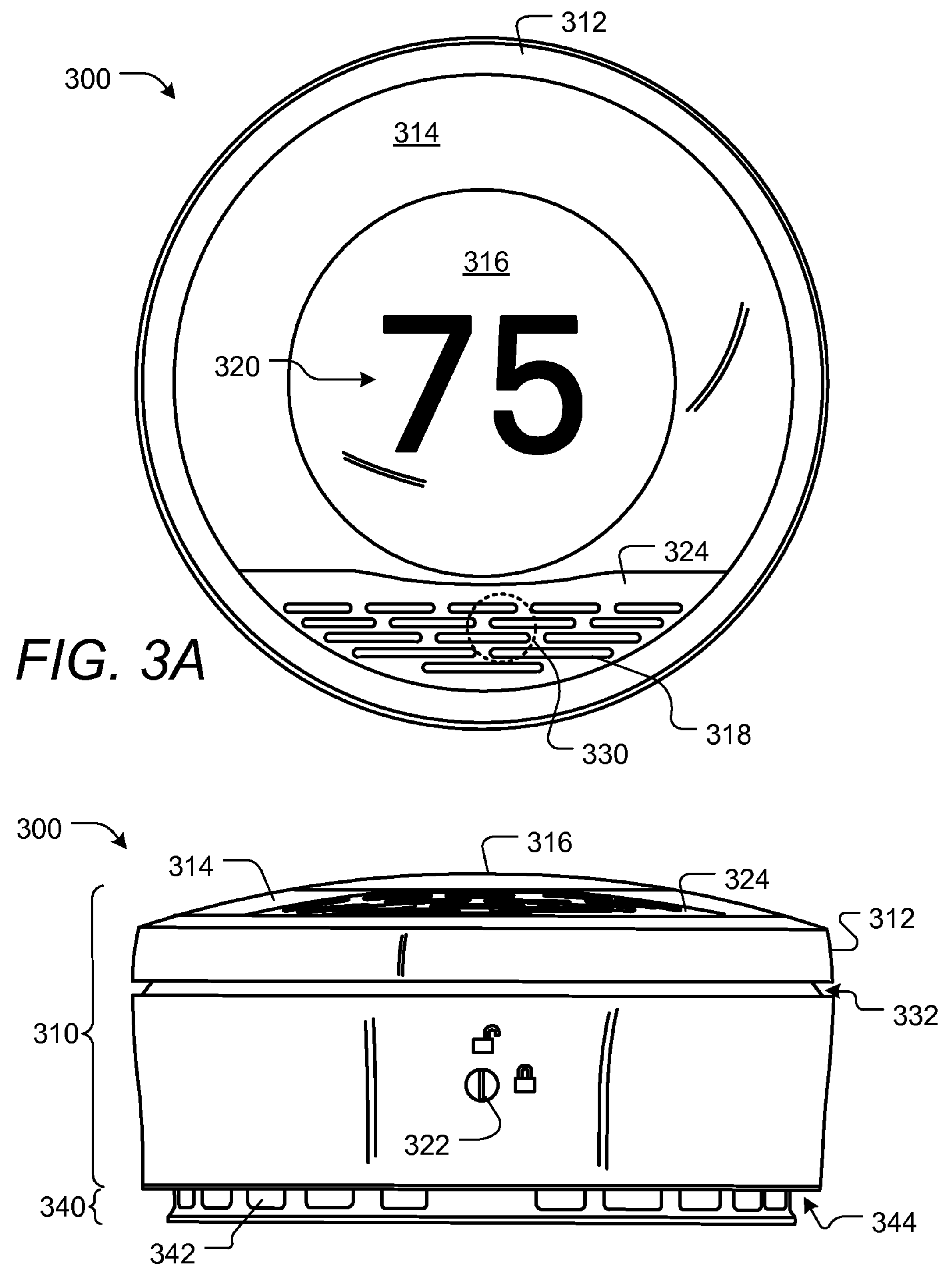
FIGS. 3A-C illustrate a thermostat having a user friendly interface, according to some embodiments.
Figure 3C:
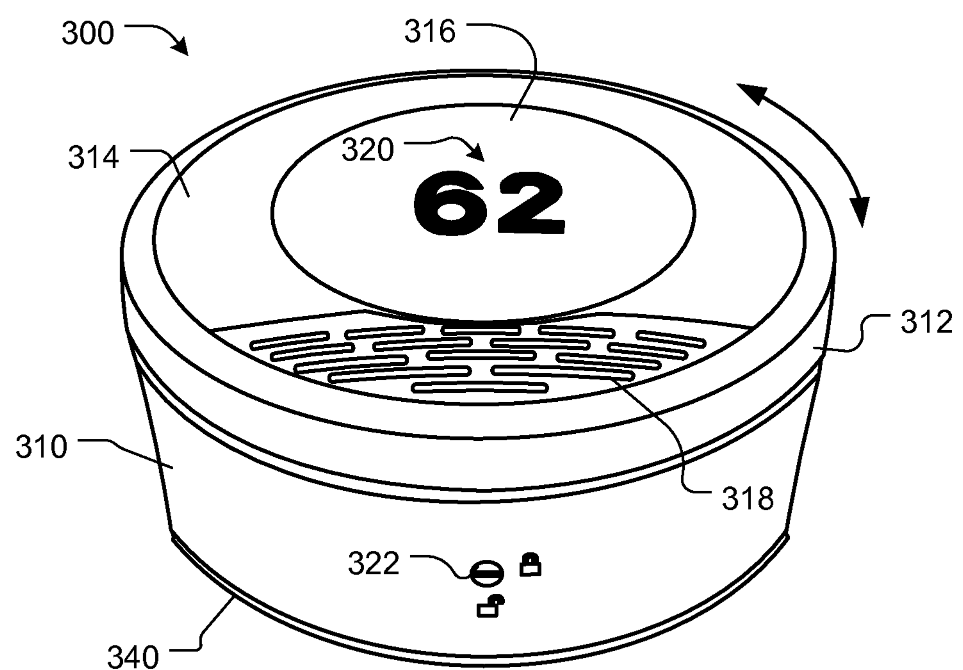

FIGS. 3A-C illustrate a thermostat having a user friendly interface, according to some embodiments. Unlike so many prior art thermostats, thermostat 300 preferably has a sleek, simple, uncluttered and elegant design that does not detract from home decoration, and indeed can serve as a visually pleasing centerpiece for the immediate location in which it is installed. Moreover user interaction with thermostat 300 is facilitated and greatly enhanced over conventional designs by the design of thermostat 300. The thermostat 300 includes control circuitry and is electrically connected to an HVAC system, such as is shown with thermostat 110 in FIGS. 1 and 2. Thermostat 300 is wall mounted and has circular in shape and has an outer rotatable ring 312 for receiving user input. Thermostat 300 has a large frontal display area 314. According to some embodiments, thermostat 300 is approximately 80 mm in diameter. The outer ring 312 allows the user to make adjustments, such as selecting a new target temperature. For example, by rotating the outer ring 312 clockwise, the target temperature can be increased, and by rotating the outer ring 312 counter-clockwise, the target temperature can be decreased. Within the outer ring 312 is a clear cover 314 which according to some embodiments is polycarbonate. Also within out ring 312 is a metallic portion 324, preferably having a number of windows 318. According to some embodiments, the surface of cover 314 and metallic portion 324 form a curved spherical shape gently arcing outward that matches a portion of the surface of rotating ring 312, as shown in the side view 3B.

According to some embodiments, the cover 314 is painted or smoked around the outer portion, but leaving a central display area 316 clear so as to facilitate display of information to users. According to some embodiments, the curved cover 314 acts as a lens which tends to magnify the information being displayed in display area 316 to users.

According to some embodiments central display area 320 is a dot-matrix layout (individually addressable) such that arbitrary shapes can be generated, rather than being a segmented layout. According to some embodiments, a combination of dot-matrix layout and segmented layout is employed. According to some embodiments, central display area 316 is a backlit color liquid crystal display (LCD). According to some embodiments, other display technologies can be used such as passive and/or monochrome LCD, organic light-emitting diode (OLED), or electronic ink (e-ink) display technology. E-ink, that reflects light while not drawing power is particularly well suited, according to some embodiments, since a thermostat typically does not require a particularly short refresh time and also benefits greatly from relatively low power consumption. An example of information is shown in FIG. 3A, which are central numerals 320.

According to some embodiments, metallic portion 324 has number of openings 318 so as to allow the use of a passive infrared proximity sensor 330 mounted beneath the portion 324. Openings 318 are used, according to some embodiments, since many useful materials are opaque to infrared energy in useful wavelengths such as about 10 microns.

Preferably, the outer ring 312 is mechanically mounted in a manner that provides a smooth yet viscous feel to the user, for further promoting an overall feeling of elegance while also reducing spurious or unwanted rotational inputs. According to some embodiments, rotating outer ring 312 rotates on plastic bearings and an optical digital encoder is used to measure the rotational movement and/or rotational position of the ring 312. According to other embodiments, other technologies such as mounting the rotating ring 312 on a central shaft may be employed.

According to some embodiments, ventilation is facilitated through gap 332 between the rotating ring 312 and the body of the head unit 310, through gap 344 between the head unit 310 and the backplate 340, and into the backplate 340 via vents 342. In general, air circulation through gaps 332 and 344 and through vents 342 serves two purposes. Firstly, the air circulation allows the ambient air to reach one or more sensors located inside the thermostat. Secondly, the air circulation allows electronics in the thermostat to cool such that heat from the electronics does not significantly effect the sensing of the ambient air characteristics. According to some embodiments, the vents 332, 344 and 342 are visually hidden from the user as shown in FIGS. 3A-3C, allows for a simple, visually uncluttered design that facilitates ease of use by users.

According to some embodiments, thermostat 300 includes a microphone for detecting or monitoring sound (within the audible range), an ultrasonic (sonar) microphone for detecting or monitoring sounds out of audible range, an infrared sensor for detecting or monitoring heat emitted from objects (e.g., people moving) and/or to detect use of infrared devices (e.g., a mobile phone or device, computer, television), an accelerometer to detect or monitor changes in motion of thermostat components or nearby objects or people, a radar sensor for detecting or monitoring changes in low emission radio waves, and/or a motion sensor for detecting motion. In some embodiments, some or all of the aforementioned sensors can be used to detect or monitor the presence or motion of an object or person. In some embodiments, some or all of the aforementioned sensors can be used to detect or monitor the presence or motions of an object or person for the purpose of preparing a user interface for an approaching user, to activate or deactivate a function or setting, to detect the occupancy of a nearby area, to receive inputs based on the presence or motion of an object or person, etc.

A locking mechanism is also provided that is engaged via turning the screw head 322 a quarter turn.

Figure 4A:
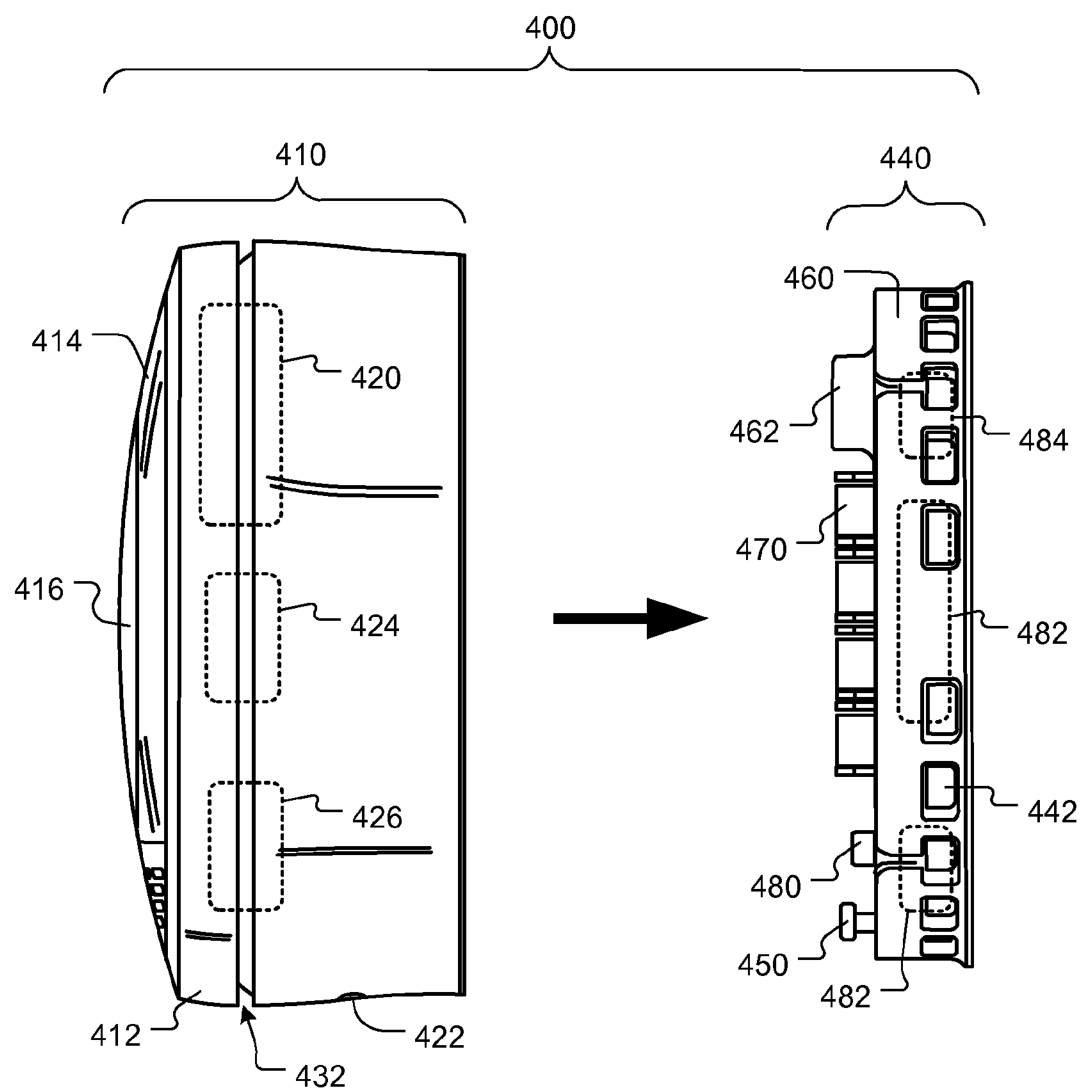
FIG. 4A illustrates a thermostat having a head unit and a backplate for ease of installation, configuration and upgrading, according to some embodiments.

FIG. 4A illustrates a thermostat having a head unit and a backplate (or wall dock) for ease of installation, configuration and upgrading, according to some embodiments. Thermostat 400 is preferably designed as shown in and described with respect to FIGS. 3A-C. As in the case of thermostat 300, thermostat 400 is wall mounted and has circular in shape and has an outer rotatable ring 412 for receiving user input. Thermostat 400 has a cover 414 that includes a display area 416. Head unit 410 of round thermostat 400 slides on to back plate 440. According to some embodiments the connection of the head unit 410 to backplate 440 can be accomplished using magnets, bayonet, latches and catches, tabs or ribs with matching indentations, or simply friction on mating portions of the head unit 410 and backplate 440.

According to some embodiments, a locking mechanism is provided wherein a post 450 on the backplate 440 is engaged by a quarter turn of a latch. According to some embodiments a flat head screw head is used for the latch. According some other embodiments other types screw heads can be used to provide greater security such as when the thermostat is being installed in public locations. According to some embodiments, the head unit 410 includes a processing system 420, display driver 424 and a wireless communications system 426. The processing system 420 is adapted to cause the display driver 424 and display area 416 to display information to the user, and to receiver user input via the rotating ring 412, as is described in greater detail herein. The processing system 420, according to some embodiments, is capable of maintaining and updating a thermodynamic model for the enclosure in which the HVAC system is installed. For further detail on the thermodynamic modeling, see U.S. patent Ser. No. 12/881,463 filed Sep. 14, 2010, which is incorporated by reference herein. According to some embodiments, the wireless communications system 426 is used to communicate with devices such as personal computers and/or other thermostats or HVAC system components.

Backplate 440 includes electronics 482 and temperature sensor 484 in housing 460, which are ventilated via vents 442. A bubble level 462 is provided to aid in the correctly orienting the thermostat when mounting on a wall. Wire connectors 470 are provided to allow for connection to HVAC system wires. Connection terminal 480 provides electrical connections between the head unit 410 and backplate 440.

The docking capability of headunit 410, according to some embodiments, provides many advantages and opportunities in both a technology sense and a business sense. Because the headunit 410 can be easily removed and replaced by even the most non-technically-savvy customer, many upgrading and upselling opportunities are provided. For example, many different versions of the headunit 410 can be separately sold, the different versions having different colors, styles, themes, and so forth. Upgrading to a new headunit 410 having more advanced capabilities becomes a very easy task, and so the customer will be readily able to take advantage of the newest display technology, sensor technology, more memory, and so forth as the technology improves over time.

Figure 15:
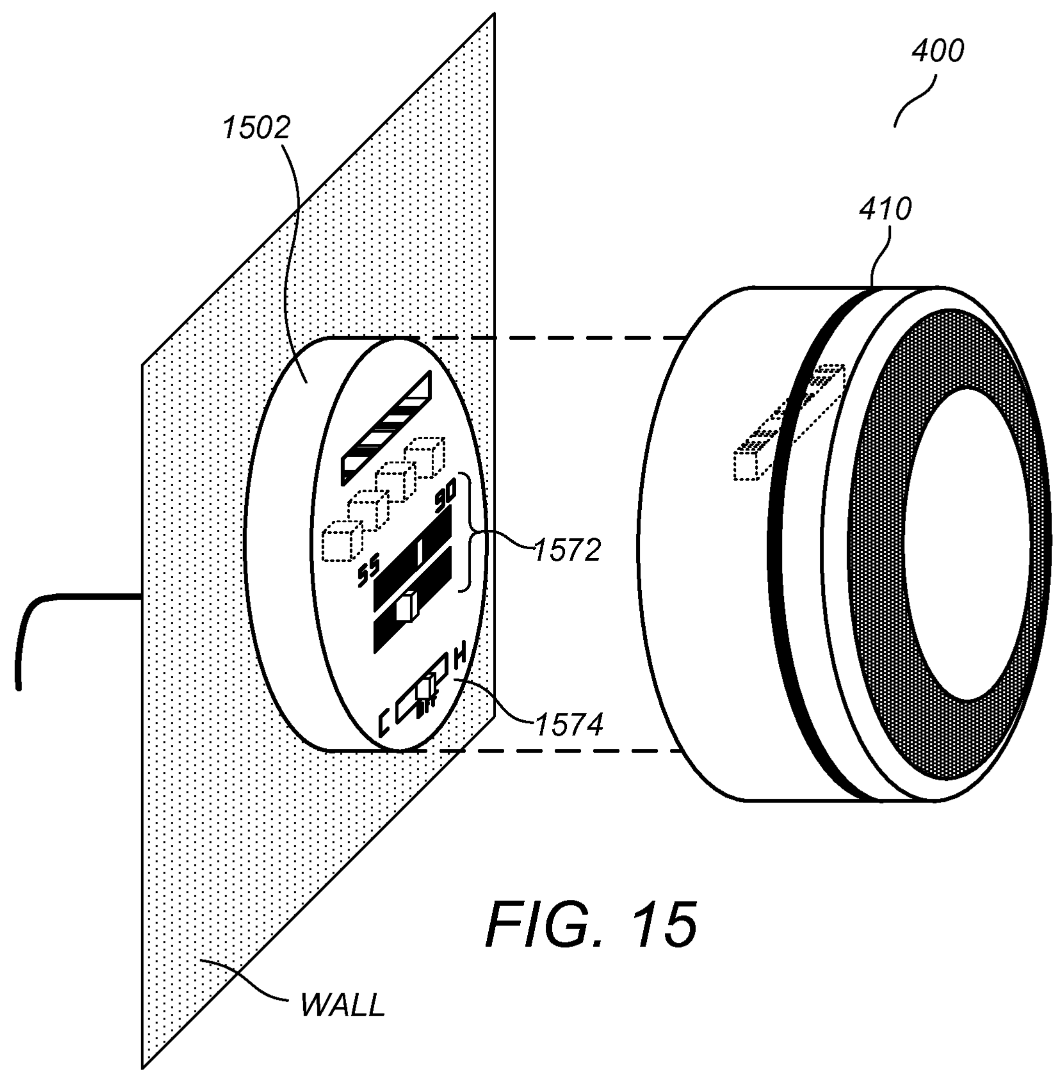
FIG. 15 illustrates an exploded perspective view of a thermostat having an HVAC-coupling wall dock, according to some embodiments.

FIG. 15 illustrates an exploded perspective view of the headunit 410 and an HVAC-coupling wall dock 1502 according to an embodiment. The HVAC coupling wall dock 1502, according to some embodiments, includes a standard temperature readout/setting dial 1572 and a simple COOL-OFF-HEAT switch 1574, and can function as an elemental, standalone thermostat when the headunit 410 is removed. This can prove useful for a variety of situations, such as if the headunit 410 needs to be removed for service or repair for an extended period of time over which the occupants would still like to remain reasonably comfortable. For one embodiment, the elemental thermostat components 1572 and 1574 are entirely mechanical in nature, such that no electrical power is needed to trip the control relays. For other embodiments, simple electronic controls such as electrical up/down buttons and/or an LCD readout are provided. For other embodiments, some subset of the advanced functionalities of the headunit 410 can be provided, such as elemental network access to allow remote control, to provide a sort of "brain stem" functionality while the "brain" (the headunit 410) is temporarily away.

Figure 4B:
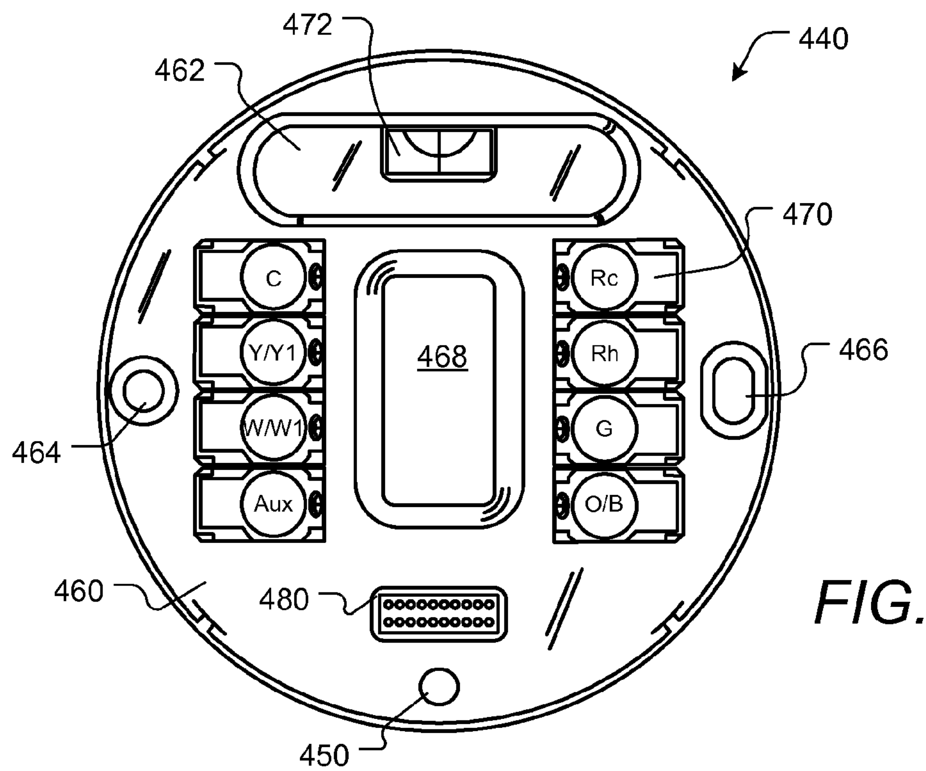
FIGS. 4B-C shows a top and bottom view of a thermostat backplate, according to some embodiments.
Figure 4C:
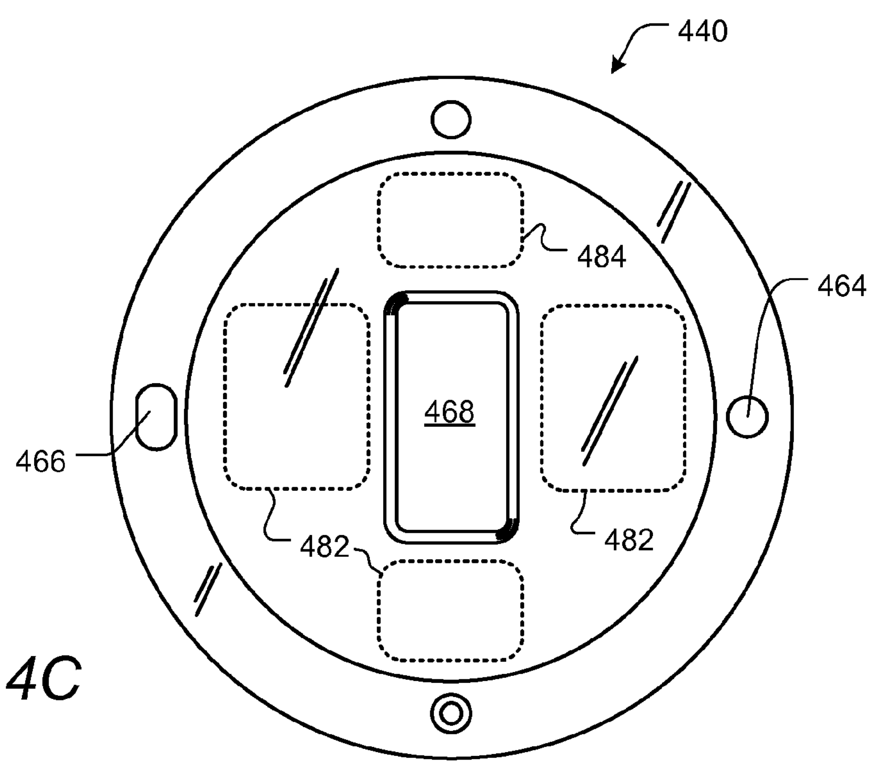

FIGS. 4B-C shows a top and bottom view of a thermostat backplate, according to some embodiments. The backplate 440 is mounted on a wall using screws through two openings: round hole 464 and slotted hole 466. By using a slotted shaped hole 466, the user or installer can make small adjustments in the angle of mounting of backplate 440. As shown in FIG. 4B, backplate 440 includes a bubble level 462 including a window 472 through which the user can check and make a level mounting of backplate 440 on a wall. The HVAC system wires pass through a large rectangular opening 468 and are connected to wire connectors 470. According to some embodiments, eight wire connectors are provided as shown in FIG. 4B, and labeled with common HVAC system wire names. FIG. 4C shows the back of backplate 440, the side that will face the wall when thermostat 400 is wall mounted. Temperature sensor 484 is includes and allows the backplate 440 to operate as a fully functional thermostat even when not connected to the headunit 410. For example, the backplate electronics 482 includes an MCU processor, and driver circuitry for opening and closing the HVAC control circuits, thereby turning on and turning off the one or more HVAC functions such as heating and cooling. The electronics 482 also includes flash memory which is used to store the series of programmed settings that take effect at different times of the day, such that the programmed set point changes can be carried out even when the headunit 410 is not attached to the backplate 440. According to some embodiments, the electronics 482 also includes power harvesting circuitry so obtain power from the HVAC control circuit(s) even when an HVAC common power wire is not available.

Figure 5A:
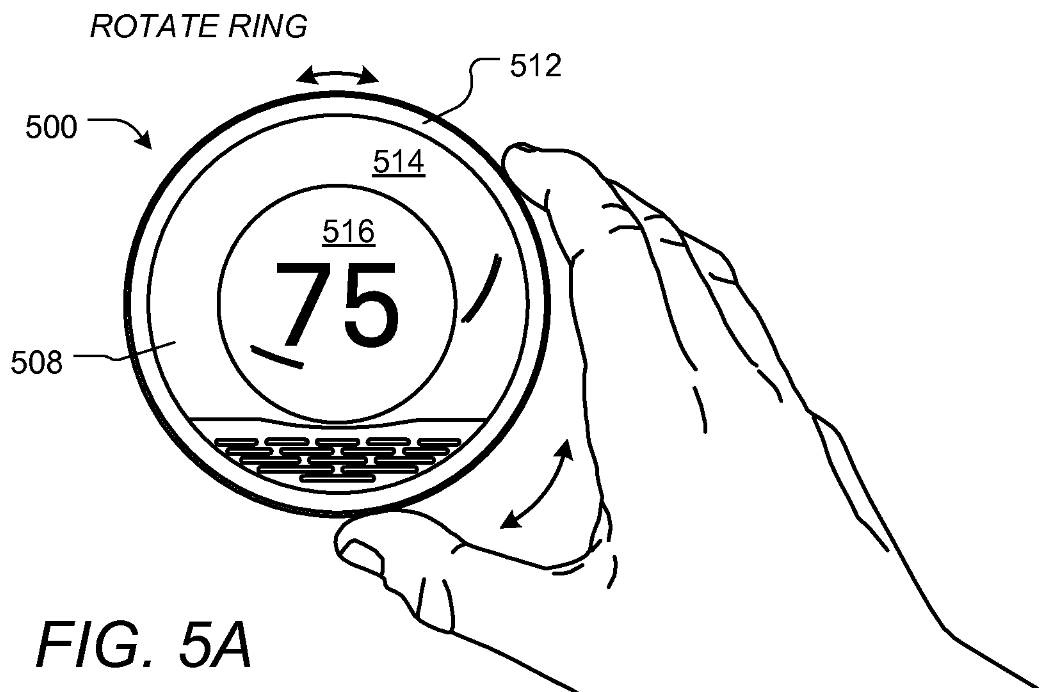
FIGS. 5A-B illustrate a thermostat as it is being controlled by the hand of a user according to some embodiments.
Figure 5B:
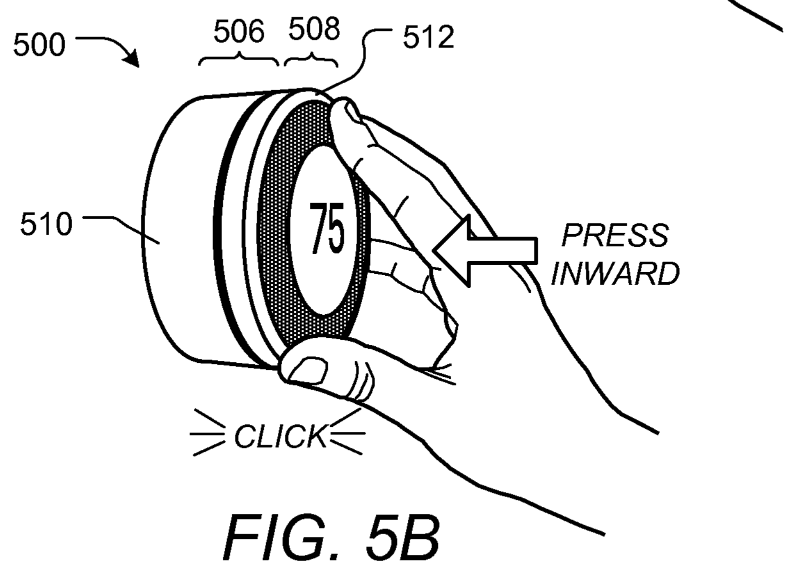

FIGS. 5A-B illustrate a thermostat as it is being controlled by the hand of a user according to some embodiments. Thermostat 500 is preferably designed as shown in and described with respect to FIGS. 3A-C and 4A-C. As in the case of thermostats 300 and 400, thermostat 500 is wall mounted and has circular in shape and has an outer rotatable ring 512 for receiving user input. Thermostat 500 has a cover 514, which includes a display area 516. Head unit 510 of round thermostat 500 slides on to back plate (not shown). The head unit 510 includes an upper cap 508 and a main body 506. The upper cap 508 includes the rotating ring 512, cover 514 and display area 516.

According to some embodiments, for the combined purposes of inspiring user confidence and further promoting visual and functional elegance, the thermostat 500 is controlled by only two types of user input, the first being a rotation of the outer ring 512 (FIG. 5B) (referenced hereafter as an "rotate ring"), and the second being an inward push on the upper cap 508 (FIG. 5C) until an audible and/or tactile "click" occurs. According to some embodiments, the inward push of FIG. 4C only causes the outer ring 512 to move forward, while in other embodiments the entire upper cap 508 moves inwardly together when pushed. Preferably, cover 514 does not rotate with outer ring 512. According to some embodiments, pushing inward of upper cap 508 can include multiple types of user input. A single brief push inward until the audible and/or tactile click occurs followed by a release (single click) can be interpreted as one type of user input (referenced hereafter as an "inward click"). Pushing the upper cap 508 and holding the inward pressure for an amount of time such as 1-3 seconds can be interpreted as another type of user input (referenced hereafter as a "press and hold"). According to some embodiments, other types of input can be interpreted by a user such as double and/or multiple clicks, and pressing and holding for longer and/or shorter periods of time. According to other embodiments, speed-sensitive or acceleration-sensitive rotational inputs may be implemented (e.g., a very large and fast leftward rotation specifies an "Away" occupancy state, while a very large and fast rightward rotation specifies an "Occupied" occupancy state).

Figure 6A:
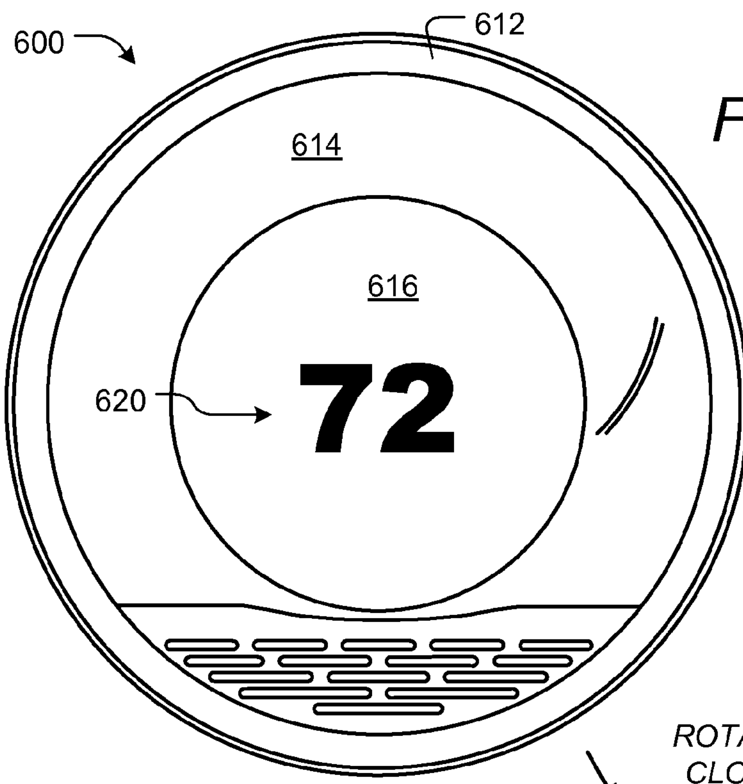
FIGS. 6A-F illustrate basic user interactions with a thermostat, according to some embodiments.

FIGS. 6A-F illustrate basic user interactions with a thermostat, according to some embodiments. Thermostat 600 is preferably designed as shown in and described with respect to FIGS. 3A-C, 4A-C and 5A-B. As in the case of thermostats 300, 400 and 500, thermostat 600 is wall mounted and has circular in shape and has an outer rotatable ring 612 for receiving user input, a cover 614 and a display area 616. Large central numerals 620 are shown in FIG. 6A, and in this case represent the current temperature. Although in FIGS. 6A-F the central numerals 620 are shown in black against a white background in display area 616, according so some embodiments the numerals 620 are displayed in white and the background of display area 616 indicates to a user the HVAC function currently be used. According to some embodiments, displaying a black background in area 616 indicates that the HVAC system is neither currently heating nor currently cooling.

Figure 6B:
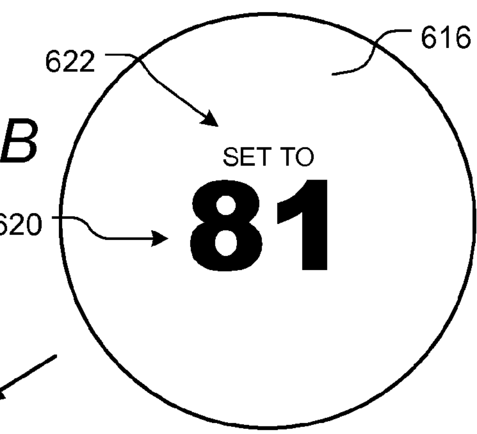

According to some embodiments, a user can change the set point of thermostat 600 by rotating the ring 612. In the example shown in FIGS. 6A-F, rotating the ring in a clockwise causes an increase in set point temperature, such as show in FIG. 6B. In FIG. 6B, the set point temperature has been increased to 81 degrees in response to the user rotating ring 612 in a clockwise direction. Central numerals 620 display "81" and the text 622 displays "SET TO" to indicate the new current set point temperature. According to some embodiments, after a short period of about 1-5 seconds, the display 616 changes to that of FIG. 6C. The text 622 changes to "HEATING TO" to indicate to the user that the HVAC heating system is currently being activated. The central numerals 620 remain displaying 81, which is the current set point temperature. The background color in area 616 is changed to indicate the heating function, which according to some embodiments is a shade of red and/or orange. According to some embodiments the color can also be used to indicate the amount of heating that will be required to reach the current set point. For example, more saturated or brighter colors indicate that a greater amount of heating will be required, and more unsaturated or darker colors indicate that a lesser amount of heating will be required. According to some embodiments, the time to reach the set point temperature is displayed textually in text 624 and/or graphically using bars 626. For further details of calculating and displaying time to reach set point temperature, please refer to U.S. patent Ser. No. 12/984,602, filed Jan. 4, 2011, which is incorporated by reference herein.

Figure 6C:
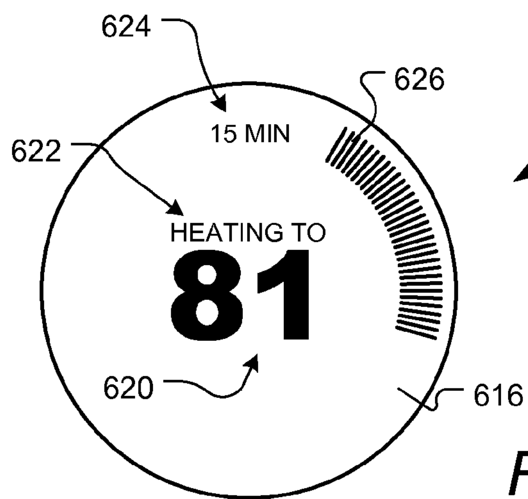

According to some embodiments, the display area 616 alternates between showing the current temperature, as in FIG. 6A, and the set point temperature, as in FIG. 6C. In this way, when the HVAC system is active, and/or anytime the set point temperature is different from the current temperature, both types of information can be displayed to users. According to some embodiments, the frequency of alternating the displays is about 3-5 seconds.

Figure 6D:
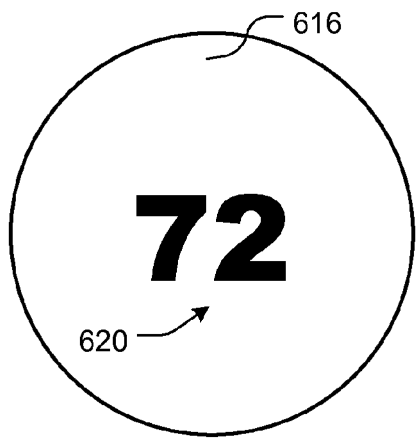
Figure 6E:
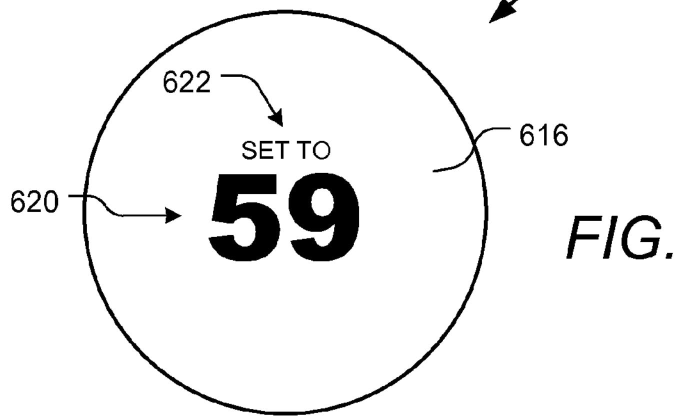

In FIG. 6E, the set point temperature has been decreased to 59 degrees in response to the user rotating ring 612 in a counter-clockwise direction from the starting point shown in FIG. 6D. Central numerals 620 display "59" and the text 622 displays "SET TO" to indicate the new current set point temperature. According to some embodiments, after a short period of about 1-5 seconds, the display 616 changes to that of FIG. 6F. The text 622 changes to "COOLING TO" to indicate to the user that the HVAC heating system is currently being activated. The central numerals 620 remain displaying 59, which is the current set point temperature. The background color in area 616 is changed to indicate the cooling function, which according to some embodiments is a shade of blue. According to some embodiments the color can also be used to indicate the amount of heating that will be required to reach the current set point. For example, more saturated or brighter colors indicate that a greater amount of cooling will be required, and more unsaturated or darker colors indicate that a lesser amount of cooling will be required. According to some embodiments, the time to reach the set point temperature is displayed textually in text 624 and/or graphically using bars 626.

Figure 6F:
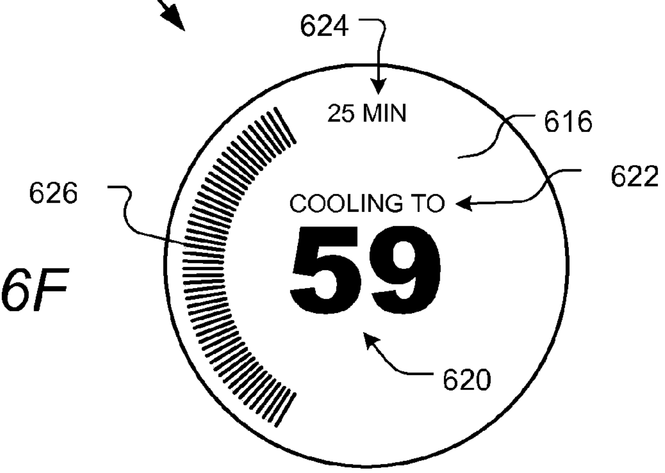

According to some embodiments, the display area 616 alternates between showing the current temperature, as in FIG. 6D, and the set point temperature, as in FIG. 6F. In this way, when the HVAC system is active, and/or anytime the set point temperature is different from the current temperature, both types of information can be displayed to users. According to some embodiments, the frequency of alternating the displays is about 3-5 seconds.

Figure 7A:
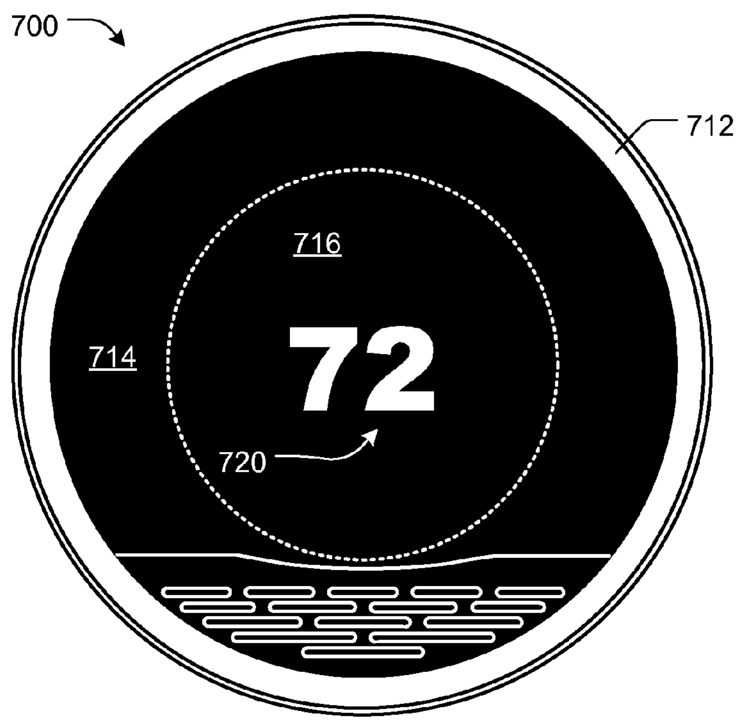
FIGS. 7A-P illustrate a thermostat having a user interface capable of viewing and editing future set points and review historical information, according to some embodiments.
Figure 7B:
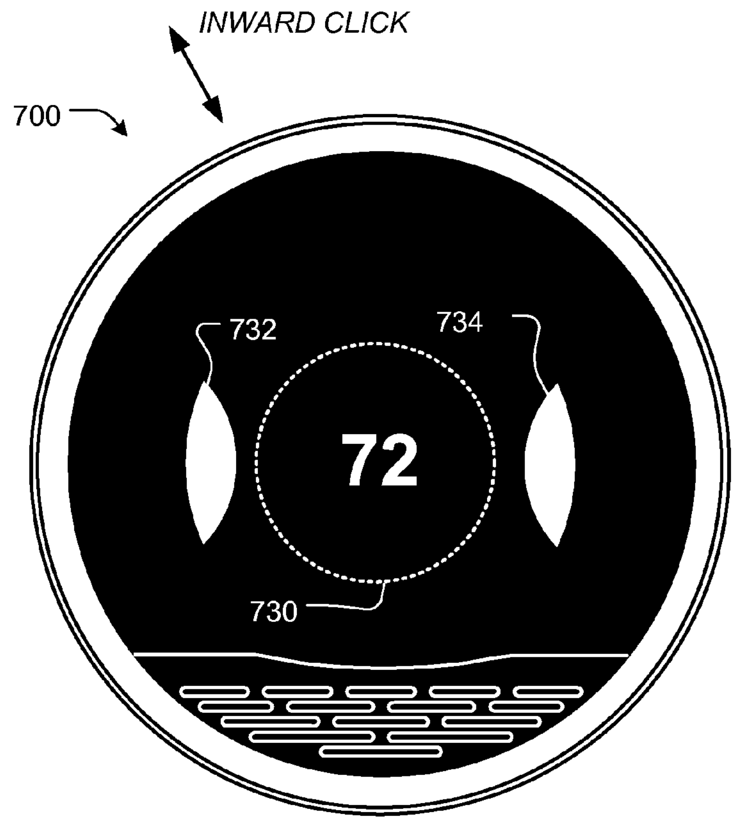
Figures 7C, 7D, 7E, 7F, 7G:
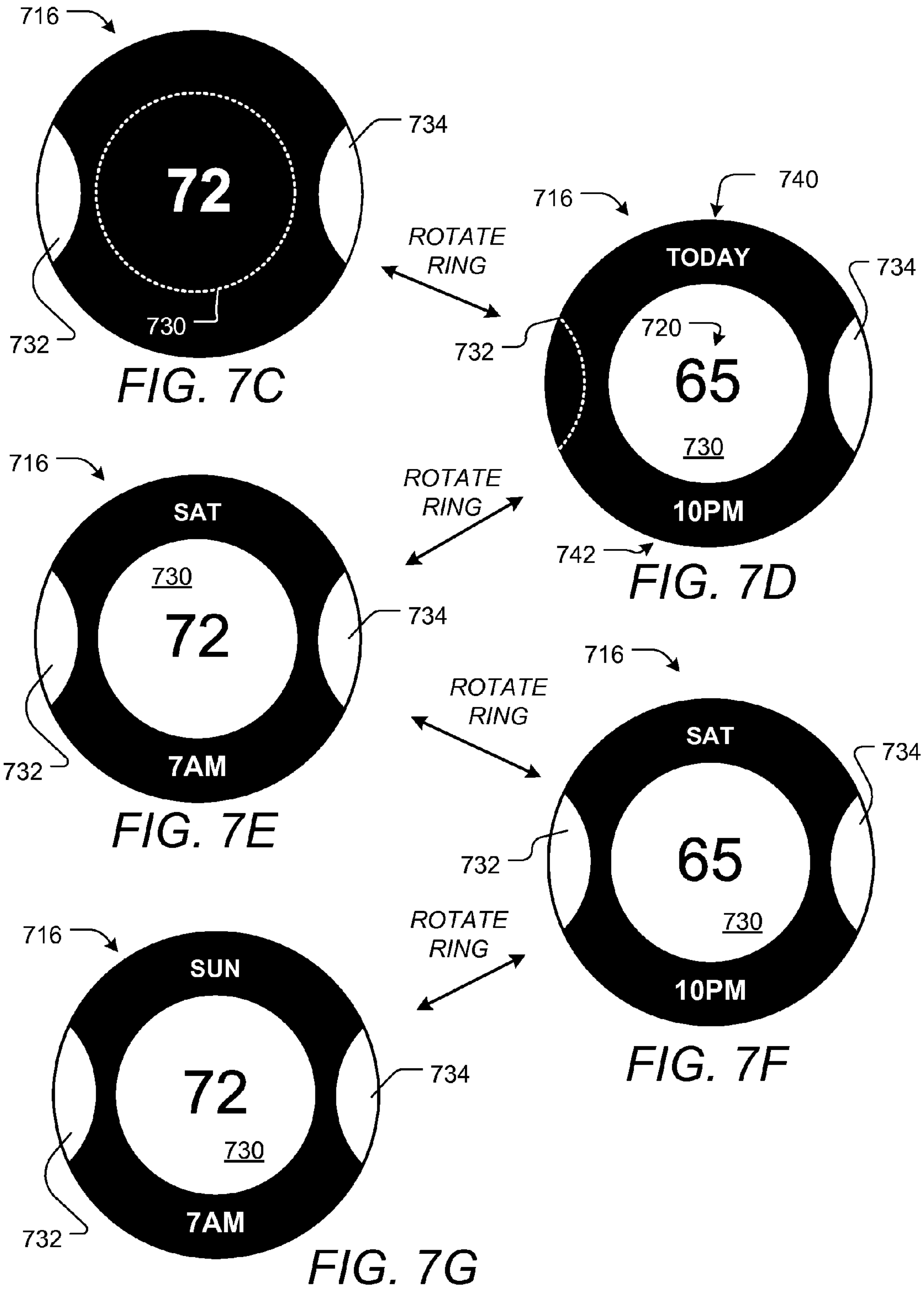
Figure 7H:
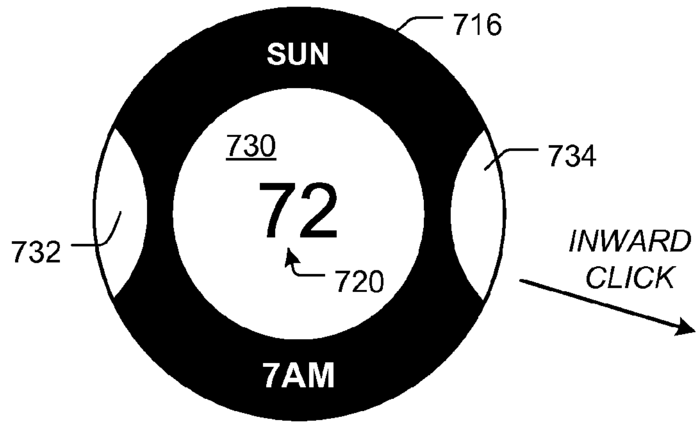
Figure 7I:
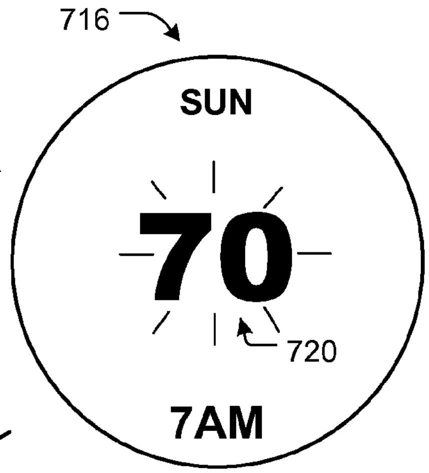
Figure 7J:
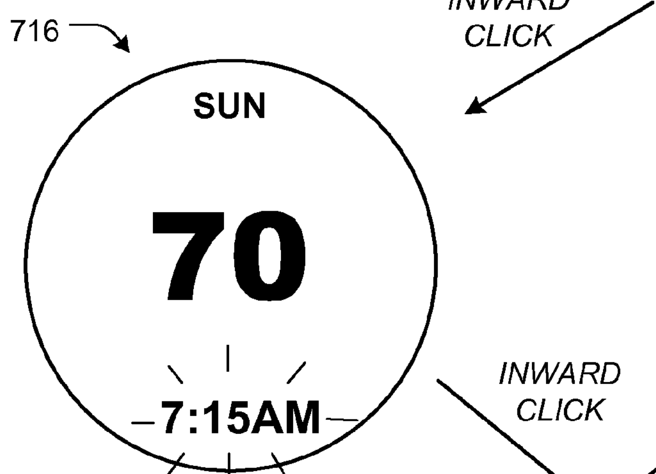
Figure 7K:
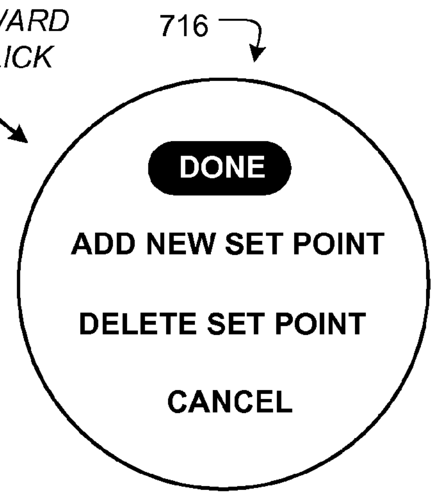
Figures 7L, 7M, 7N, 7O, 7P:
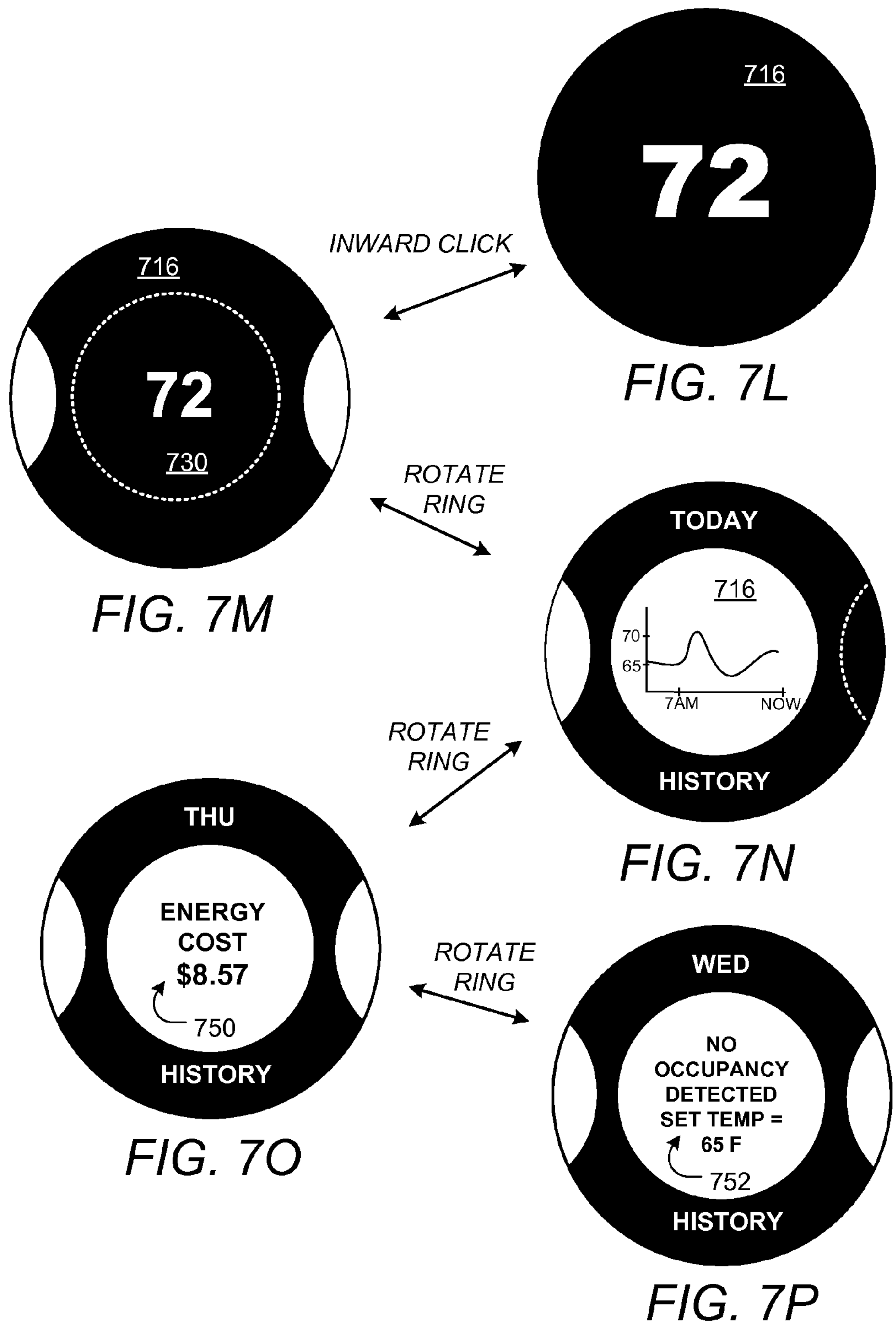

FIGS. 7A-P illustrate a thermostat having a user interface capable of viewing and editing future set points and review historical information, according to some embodiments. Thermostat 700 is preferably designed as shown in and described with respect to FIGS. 3A-C, 4A-C, 5A-B, and 6A-F. As in the case of thermostats 300, 400, 500 and 600, thermostat 700 is wall mounted and has circular in shape and has an outer rotatable ring 712 for receiving user input, a cover 714 and a display area 716 marked by the dotted white circle. Large central numerals 720 are shown in FIG. 7A, and in this case represent the current temperature. According to some embodiments, in FIG. 7A, the background of display area 716 is black indicating that the HVAC system is inactive (i.e. neither currently heating nor currently cooling) and numerals 720 are white.

According to some embodiments, the future scheduled program and/or historical information are accessed by the user via a inward click. FIG. 7B show the thermostat 700 immediately following an inward click. The information that was previously displayed showing the current status, in this case the current temperature of 72 is shrunk down in size as shown by the dotted ring 730 in FIG. 7B. Note that if the current status had shown current heating or cooling, such as with colors such as described with resect to FIGS. 6A-F above, the color and set point temperature would be displayed in the area within dotted ring 730 of FIG. 7B. The two partial circles 732 and 734 on the left and right sides of circle 730, respectively, indicate to the user that another screen lies to the left and right that can be accessed via rotating the ring 712.

FIG. 7C is a view of display 716 as shown in FIG. 7B. In response to a ring rotation the program schedule is accessed. FIG. 7D shows that later today, as indicated by the text 740 "TODAY" at 10 pm, as indicated by the text 742 "10 PM," the set point is scheduled to be changed to 65, as indicated by the numerals 720 "65." Note that the two partial circles 732 and 734 are shown to aid the user in navigation. In the example shown in FIG. 7D, the left partial circle 732 is shown in black, or whatever color was being used to indicate the current status, as discussed with respect to FIGS. 7A-C. By rotating the ring further in the same direction (e.g. clockwise), the further programmed set points, shown in FIGS. 7E, 7F and 7G are progressively displayed. By rotating the ring 712 in the opposite direction (e.g. counter-clockwise), progressively earlier programmed set points are displayed.

According to some embodiments the scheduled program can be edited by a user. From any of the displayed programmed set points, such as shown in screen 716 in FIG. 7H, an inward click is used to indicate the desire to edit the set point. In response to an inward click, the white inner circle 730 expands to fill the display area 716 as shown in FIG. 7I. The set point temperature indicated by numerals 720 also blinks that indicates to the user the value that will be altered by rotating ring 712. When the desired set point temperature is set using the ring 712, another inward click will advance to FIG. 7J. In FIG. 7J, the time blinking, and is adjusted using the rotating ring 712. When the desired set point temperature is set using the ring 712, another inward click will advance to FIG. 7K. In FIG. 7K, the user uses the rotating ring 712 to select one of four choices lists. The selected choice is highlighted in black or a different suitable contrasting color or using an outline. The choices shown in FIG. 7K are: "DONE" which will accept the changes and take the user back to the displayed schedule screen shown in FIG. 7H; "ADD NEW SET POINT" which will add a new programmed set point change for the given day; "DELETE SET POINT" which sill delete the current programmed set point; and "CANCEL" which will return the user to the displayed schedule screen without making any changes. According to some embodiments, the thermostat has a predefined number of set points (such as 4 per day=28 per week) which can each be edited as shown in FIGS. 7I and 7J, but for simplicity and ease of use, the user cannot add new set points or delete set points.

According to some embodiments, historical information can be displayed to the user as shown in FIGS. 7L-P. FIG. 7L shows the display area 716 as in FIG. 7A. An inward click from a user causes the display are 716 to change to the navigation mode shown in FIG. 7M which corresponds to display area 716 in FIG. 7B. By rotating the ring in the opposite direction as would cause the display of future programmed set points (such as shown in FIGS. 7D-G), a display of historical information can be accessed by the user. According to some embodiments, as shown in FIG. 7N historical temperature can be displayed in graphical form. For further details on interactively displaying historical information, see FIGS. 13 and 14A-B.

Figures 8A, 8B, 8C, 8D, 8E, 8F:
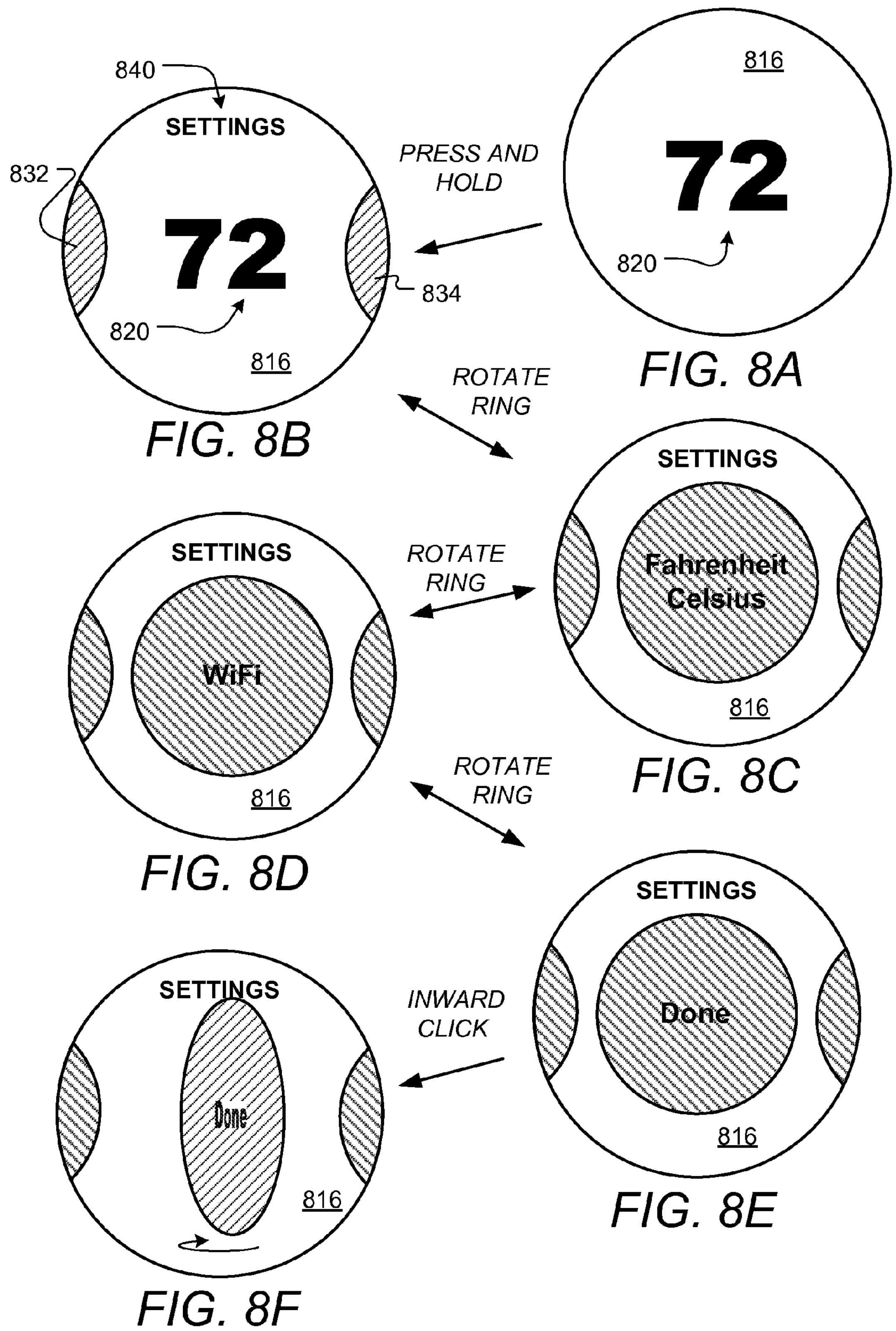
FIGS. 8A-F illustrates how other thermostat settings can be made using a user interface, according to some embodiments.

FIGS. 8A-F illustrates how other thermostat settings can be made using a user interface, according to some embodiments. FIG. 8A shows a display area 816 that corresponds to the display area 316, 416, 516, 616 and 716 in the previous figures and as described herein. In FIG. 8A, the thermostat is displaying a current temperature of 72, for examples using numerals 820. According to some embodiments, settings are accessed by an inward press and hold of the upper cap of the thermostat. The settings navigation screen shown in FIG. 8B, following a press an hold, where the current temperature is shown with numerals 820, two partial circles 832 and 834 indicate to the user that by rotating the outer ring further settings screens can be accessed. The word "SETTINGS" is displayed text 840 to indicate to the user that the settings menu is being displayed. By rotating the ring, various settings can be displayed and edited. For example, FIG. 8C shows a screen for setting Fahrenheit or Celsius and FIG. 8D shows a screen for setting WiFi access. According to some embodiments, the particular setting is viewed and can be altered by a press and hold operation while the desired setting type is being displayed. For example, if a user wanted to update the WiFi settings, a press and hold from screen 8D would cause a display of the current WiFi settings such as the name of the network currently being used, and an option to select a different network and/or enter network security passwords.

According to some embodiments, the settings mode is exited by navigating to the "DONE" screen shown in FIG. 8E, and then making an inward click. According to some embodiments, the a coin flip transition is used to indicate to the user that a mode is being change, in this case as shown in FIG. 8F, the coin flip transition indicates the transition from Settings Mode back to current display. Thus, according to some embodiments, transitions between screens can graphically indicated to the user in different ways including: a coin-flip transition (see e.g. FIG. 8F); a shrinking or growing portion of the display (see e.g. 7A and 7B); and a translation or shifting of displayed elements from right-to-left or from left-to-right (see e.g. FIGS. 7C-G).

Figure 9A:
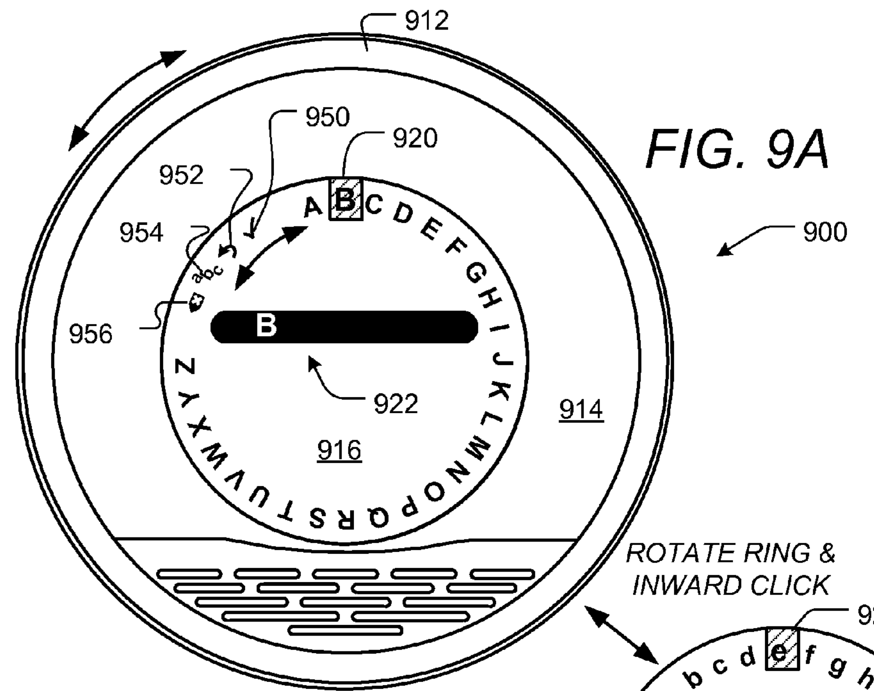
FIGS. 9A-D illustrate a thermostat having a user interface capable of entering textual information, according to some embodiments.
Figure 9B:
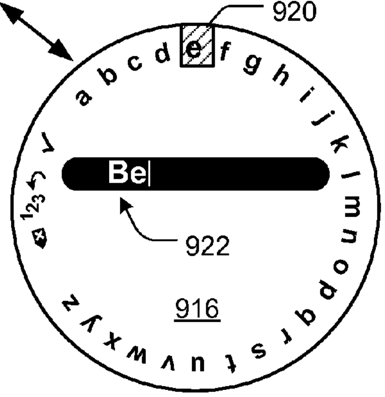
Figure 9C:
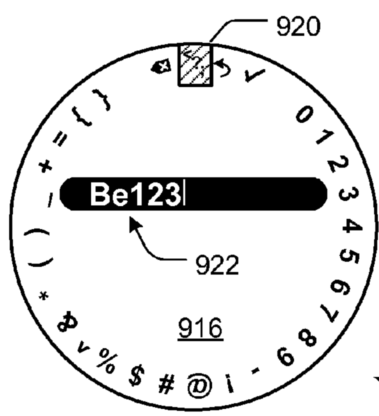
Figure 9D:
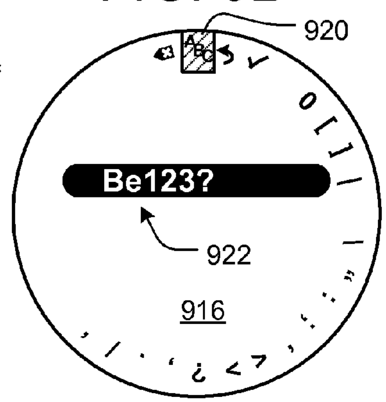

FIGS. 9A-D illustrate a thermostat having a user interface capable of entering textual information, according to some embodiments. Thermostat 900 is preferably designed as shown in and described with respect to FIGS. 3A-C, 4A-C, 5A-B, 6A-F and 7A-P. As in the case of thermostats 300, 400, 500, 600 and 700, thermostat 900 is wall mounted and has circular in shape and has an outer rotatable ring 912 for receiving user input, a cover 914 and a display area 916. In FIG. 9A, a screen is shown that allows the user to enter capital letters into the entry window 922 by rotating the outer ring 912 which causes the letters to rotate around the outer area of display area 916, and when the desired character is positioned within the window 920 the character is selected by a inward click operation. Other than the capital letters: the check mark 950 is used to indicate the text entry operation is finished the selected text should be accepted; the back arrow 952 is used to indicate the text entry operation should be cancelled; a symbol 954 representing another group of characters should be selected for input; and a backspace symbol 956 is used to delete the most recently entered character. FIG. 9B illustrates the lower case characters, and FIGS. 9C and 9D show numbers and various other characters that can be entered.

In some embodiments, thermostat 900 is programmed to provide a software lockout functionality, wherein a person is required to enter a password, code, or combination before thermostat 900 will accept their control inputs. The user interface for password request and entry can be similar to those shown in FIGS. 9A-D. The software lockout functionality can be highly useful, for example, for Mom and Dad in preventing their teenager from making unwanted changes to the set temperature, for various landlord-tenant scenarios, and in a variety of other situations.

Figures 10A, 10B:
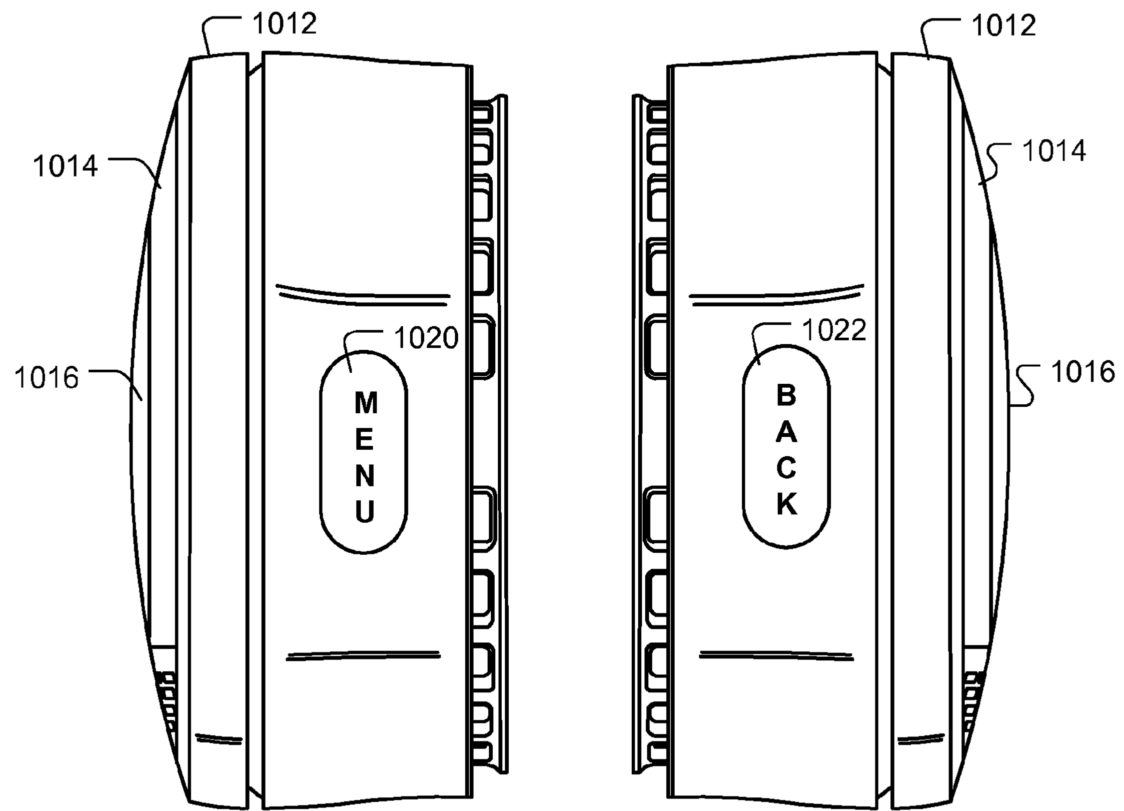
FIGS. 10A and 10B show a thermostat having further buttons to facilitate user input and navigation, according to some embodiments.

FIGS. 10A and 10B show a thermostat having further buttons to facilitate user input and navigation, according to some embodiments. Thermostat 1000 is preferably designed as shown in and described with respect to FIGS. 3A-C, 4A-C, 5A-B, 6A-F, 7A-P and 9A-D. As in the case of thermostats 300, 400, 500, 600, 700 and 900, thermostat 1000 is wall mounted and has circular in shape and has an outer rotatable ring 1012 for receiving user input, a cover 1014 and a display area 1016. According to some embodiments, the settings screen of FIG. 8B can be accessed, for example by using an dedicated button 1020 labeled "MENU" or "SETTINGS" or the like as shown in FIG. 10A. According to some embodiments, the user can reverse the navigation through the various screens and menus by pressing a dedicated button 1022 labeled "BACK" as shown in FIG. 10B.

Figure 11A:
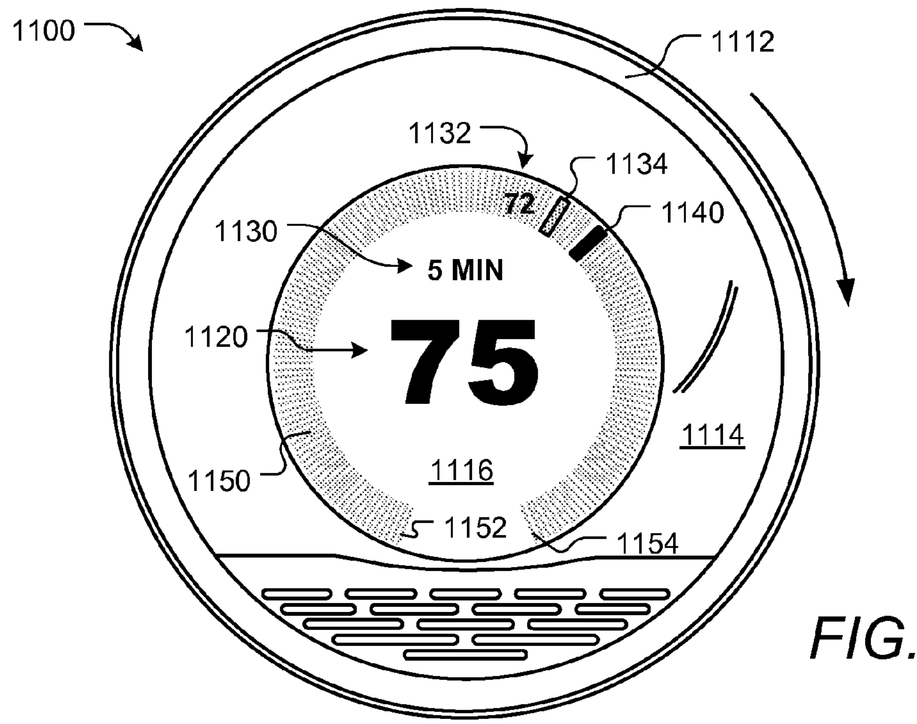
FIGS. 11A-B illustrate further aspects of a user interface for a thermostat according to some embodiments.
Figure 11B:
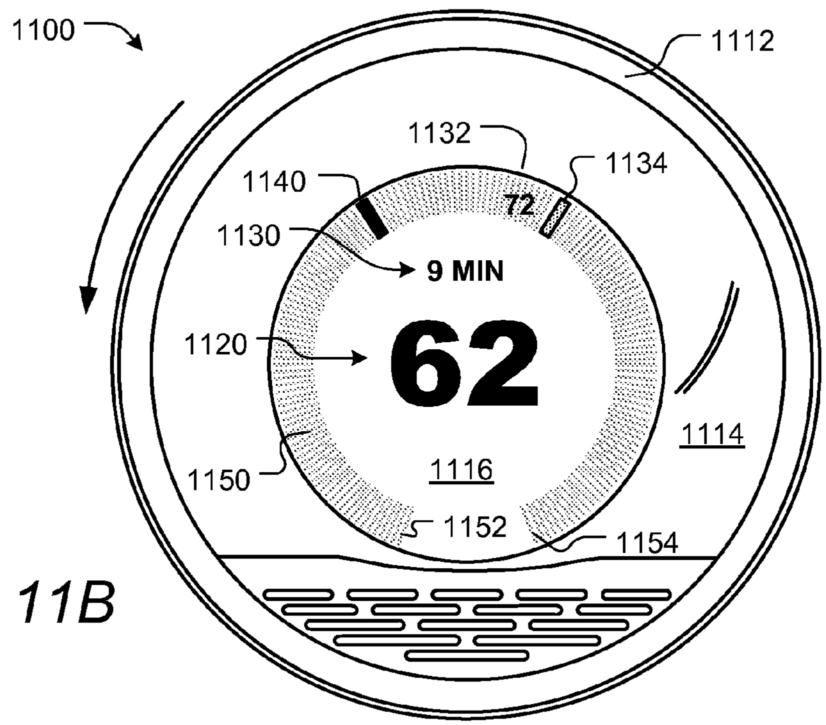

FIGS. 11A-B illustrate further aspects of a user interface for a thermostat according to some embodiments. Thermostat 1100 is preferably designed as shown in and described with respect to FIGS. 3A-C, 4A-C, 5A-B, 6A-F, 7A-P, 9A-D and FIGS. 10A-B. As in the case of thermostats 300, 400, 500, 600, 700, 900 and 1000, thermostat 1100 is wall mounted and has circular in shape and has an outer rotatable ring 1112 for receiving user input, a cover 1114 and a display area 1116. FIGS. 11A and 11B show further detail of portions of the user interface while the user is adjusting the set point temperature using rotating ring 1112, according to some embodiments. As in some prior figures, the display 1116 is illustrated with black characters and graphics against a white background for clarity, although according to some preferred embodiments, the characters and graphics are shown in white or some other bright color against a background that is either black or some other color as might be used to indicate current HVAC functionality. When the user rotates the ring 1112 in either direction, thermostat 1100 responds by displaying scale tick marks 1150 around the outer area of display 1116 as shown. According to some embodiments, the tick marks 11150 are shown in decreased contrast with respect to the background, such as decreased brightness in cases there the information is displayed in lighter colors against a darker background. For example, according to some embodiments, the scale ticks 1150 are shown at a brightness value of 75, where a value of 100 represents full brightness. The current temperature is shown by numerals 1132, and graphically along the tick scale 1150 by current temperature tick 1134. According to some embodiments, current temperature tick 1134 is wider than the scale ticks 1150 and/or have higher contrast from the background, such as a brightness value of 86 against a darker background. As the rotating ring 1112 is moved by the user in the clockwise direction, the set point temperature is adjusted in an upward direction. The set point temperature is displayed numerically using central numerals 1120 and graphically in the form of a set point tick 1140. According to some embodiments, the set point tick is wider and/or has even higher contrast than the current temperature tick 1134, for example a brightness value of 100 against a darker background. Also shown is the estimated time to reach the set point temperature 1130. Note that the location of the set point tick 1140 depends on the set point temperature, with higher temperatures being represented in the clockwise direction and lower temperatures in the counter-clockwise directions. In FIG. 11B, the set point temperature is being adjusted to be lower than the current temperature (for example, when the user is calling for cooling rather than heating) in which case the set point tick 1140 is shown to the left of the current temperature tick 1134. According to some embodiments, the current temperature numerals 1132 is located on the left side of the of the current temperature tick 1134 while heating and on the right side when cooling. Note also that the ends 1152 and 1154 of the scale ticks 1150 can represent the safety minimum temperature and maximum temperature, respectively. According to some embodiments, after a suitable amount of time, such as three seconds, of user inactivity (i.e. no further rotation of ring 1112), the scale ticks 1150 fade to transparent. Note that although in this example, clockwise is used for higher temperatures and counter clockwise for lower temperatures, according to some embodiment these directions are reversed.

FIGS. 12A-C illustrate aspects of a thermostat user interface, according to some embodiments. It has been found that the rotating ring user input device is particularly well suited to certain types of interactive display techniques. In particular, according to some embodiments, displaying rotating dials of numbers and/or characters have been found to be particularly useful when obtaining user input for fields of data that are of a fixed character length, and have limited possible characters in each character position. The rotating dial display has been found to give the user positive feedback in terms of quickly finding the correct characters that need to be input. FIG. 12A shows thermostat 1200 having a rotating ring 1212 and circular display area 1216. A display 1220 is used for obtaining the user's preference for a monthly budget. According to one embodiment, each of the three dollar numerals individually set using the rotating ring 1212 and then accepted using a inward click. According to another embodiment, the entire dollar amount, that is, all three digits is adjusted at once using the dial. FIG. 12B shows an example of a display 1222 for entering numerals in a U.S. ZIP code. A similar dial format can be used for combinations of letters and numbers such as are used in other geographic locations. FIG. 12C shows a date entry display 1224. Note that according to some embodiments, when the year field is changed from 2012 to 2011, for example, the day number field automatically changes to a valid day number, for example from 29 to 28.

Figure 13:
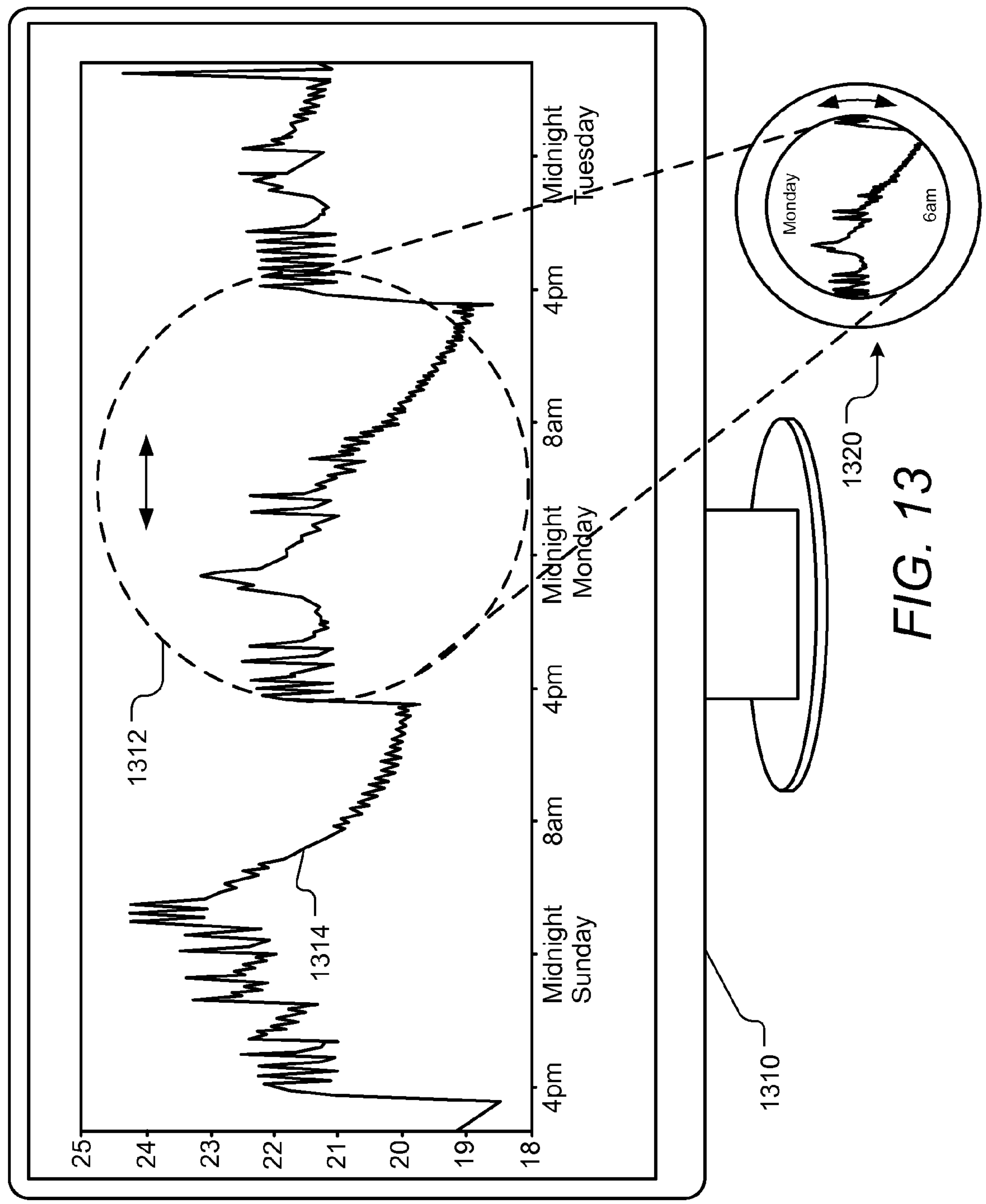
FIG. 13 shows the relationship between a computer display and thermostat display, according to some embodiments.

FIG. 13 shows the relationship between a computer display and thermostat display, according to some embodiments. In this example, historical temperature information is represented by curve 1314 and is being displayed to a user on a computer display 1310. The same information can be viewed by a user on the circular display of the thermostat 1320 using a combination of ring rotation and inward clicks, as is described herein. The historical display can be navigated to by a user as described, for example, with respect to FIGS. 7L-P. In the case shown in FIG. 13, the historical temperature data within the window 1312 is shown to the user in the circular display of thermostat 1320. According to some embodiments, the display shifts to the left and right using the rotating ring and is zoom-able, using a combination of inward click and rotating the ring.

Figure 14A:
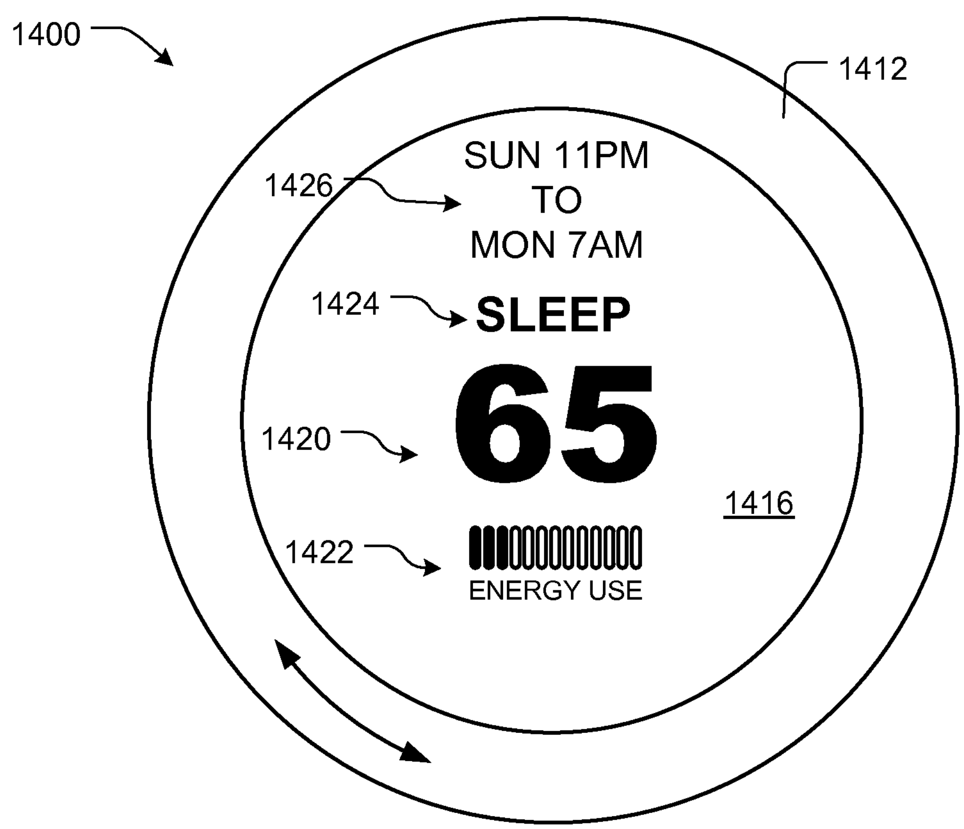
FIGS. 14A-B show a thermostat having an interactive user interface, according to some embodiments.
Figure 14B:
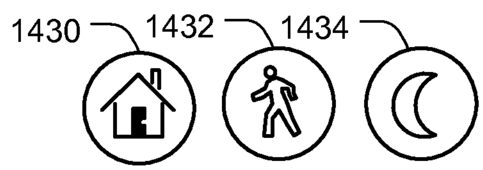

FIGS. 14A-B show a thermostat having an interactive user interface, according to some embodiments. Thermostat 1400 has a rotating ring 1412 and a circular display 1416 as shown. The display 1416 is being used to display historical information to the user, and can correspond to a screen such as shown in FIGS. 7N-P. The time period 1426, set temperature 1420, relative energy use 1422 and occupancy mode 1424 is displayed as shown. Note that other forms of display can be used, according to other embodiments. For example, in FIG. 14B, icons 1430, 1432 and 1434 are used to symbolically display to the user occupancy modes for "home," "away," and "sleep," respectively.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the inventive body of work is not to be limited to the details given herein, which may be modified within the scope and equivalents of the appended claims.

The invention claimed is:

1. A wall-mounted device for sensing and control for one or more systems in a home environment, said device comprising:

a body having a circular cross-section, a wall-facing rear surface, and a user-facing front surface;

an outer ring that laterally surrounds said body to form a circular lateral periphery of said device, said outer ring being user-rotatable around said body and being inwardly pressable;

at least one environmental sensing component disposed within said body;

a communication component configured for providing wired or wireless sensing and/or control-related communications with said one or more systems in the home environment;

a user-facing circular display component configured to highlight respective ones of a circular arrangement of display elements appearing near a periphery thereof as a user rotates said outer ring;

a user input component formed by said user-facing circular display component and said outer ring, wherein a user selection of one of said display elements is established upon an inward pressing of said outer ring while said one of said display elements is highlighted, and wherein plural respective user selections of different ones of said display elements are established by repeated user rotations and inward pressings of said outer ring; and a processor in operative communication with said at least one environmental sensing component, said communication component, and said user input component;

wherein said processor is configured and programmed to provide a software lockout functionality in which user access to the control of one or more sensing or control functions of said device is prevented unless a user enters a password or combination using said user input component.

2. The device of claim 1, wherein said at least one environmental sensing component comprises a temperature sensor, an infrared sensor, and a visible light sensor.

3. The device of claim 1, wherein said at least one environmental sensing component comprises an occupancy sensing component, an acoustic sensing component, and a camera component.

4. The device of claim 1, wherein said user-facing front surface is configured such that said at least one environmental sensing component is substantially visually concealed from user view while being substantially exposed to said environmental condition being sensed.

5. The device of claim 4, wherein said at least one environmental sensing component comprises an acoustic sensing component and/or a temperature sensor, and wherein said user-facing front surface is configured with a grill member that exposes said at least one environmental sensing component to ambient air while substantially concealing said at least one environmental sensing component from user view.

6. The device of claim 1, wherein said user-facing front surface provides a darker background against which one or more of said plurality of display elements is highlighted.

7. The device of claim 1, wherein user access to the control of said one or more sensing or control functions of said device enables a user to lock or unlock one of said systems in said home environment.

8. A method for using a wall-mounted device for sensing and control for one or more systems in a home environment, said method comprising:

detecting a user rotation of an outer ring that laterally surrounds a body of said device to form a circular lateral periphery of said device, said body having a circular cross-section, a wall-facing rear surface, and a user-facing front surface, said outer ring being user-rotatable around said body for enabling said user rotation, said device having a user-facing circular display component, said user-facing circular display component and said outer ring forming a user input component, wherein at least one environmental sensing component is disposed within said body of said device, wherein said device includes a communication component configured for providing wired or wireless sensing and/or control-related communications with said one or more systems in the home environment, wherein said device includes a processor in operative communication with said at least one environmental sensing component, said communication component, and said user input component;

highlighting, based on said user rotation of said outer ring, respective ones of a circular arrangement of display elements appearing near a periphery of said user-facing circular display component;

detecting an inward pressing of said outer ring, said outer ring being inwardly pressable for enabling said inward pressing;

identifying as a user selection one of said display elements that is highlighted when said inward pressing of said outer ring is detected, wherein plural respective user selections of different ones of said display elements are identified responsive to repeated user rotations and/or inward pressings of said outer ring; and permitting user access to the control of one or more sensing or control functions of said device if said plural respective user selections corresponds to a password or combination.

9. The method of claim 8, wherein said at least one environmental sensing component comprises a temperature sensor, an infrared sensor, and a visible light sensor.

10. The method of claim 8, wherein said at least one environmental sensing component comprises an occupancy sensing component, an acoustic sensing component, and a camera component.

11. The method of claim 8, wherein said user-facing front surface is configured such that said at least one environmental sensing component is substantially visually concealed from user view while being substantially exposed to said environmental condition being sensed.

12. The method of claim 11, wherein said at least one environmental sensing component comprises an acoustic sensing component and/or a temperature sensor, and wherein said user-facing front surface is configured with a grill member that exposes said at least one environmental sensing component to ambient air while substantially concealing said at least one environmental sensing component from user view.

13. The method of claim 8, wherein said user-facing front surface provides a darker background against which one or more of said plurality of display elements is highlighted.

14. The method of claim 8, wherein user access to the control of said one or more sensing or control functions of said device enables a user to lock or unlock one of said systems in said home environment.

15. A wall-mounted device for sensing and control for one or more systems in a home environment, said device comprising:

a body having a circular cross-section and a central axis, said central axis extending generally perpendicular to a wall when said device is wall-mounted, said body having a sidewall that extends along a length of said central axis between first and second ends of said body, said sidewall having inner and outer surfaces, said inner surface at least partially defining an interior area of said body, said first end of said body being wall-facing when said device is wall-mounted, said send end of said body being user-facing when said device is wall-mounted, said first end of said body having a wall-facing outer surface, said first end of said body having a user-facing outer surface;

an outer ring surrounding at least a portion of said outer surface of said sidewall of said body, said outer ring having an axis of rotation that extends generally parallel to said central axis of said body, said outer ring being configured to be rotatable generally about said axis of rotation, wherein at least a portion of said outer ring is configured to be inwardly pressable generally toward said wall when said device is wall-mounted;

at least one environmental sensing component being at least partially disposed within said interior area of said body;

a communication component being configured for providing wired or wireless sensing and/or control-related communications with said one or more systems in the home environment;

a user-facing circular display component being configured to highlight respective ones of a circular arrangement of display elements appearing near a periphery thereof as a user rotates said outer ring;

a user input component being formed by said user-facing circular display component and said outer ring, wherein a user selection of one of said display elements is established upon an inward pressing of said outer ring while said one of said display elements is highlighted, and wherein plural respective user selections of different ones of said display elements are established by repeated user rotations and inward pressings of said outer ring; and a processor being in operative communication with said at least one environmental sensing component, said communication component, and said user input component;

wherein said processor is configured and programmed to provide a software lockout functionality in which user access to the control of one or more sensing or control functions of said device is prevented unless a user enters a password or combination using said user input component.

16. The device of claim 15, wherein said at least one environmental sensing component comprises a temperature sensor, an infrared sensor, and a visible light sensor.

17. The device of claim 15, wherein said at least one environmental sensing component comprises an occupancy sensing component, an acoustic sensing component, and a camera component.

18. The device of claim 15, wherein said user-facing outer surface is configured such that said at least one environmental sensing component is substantially visually concealed from user view while being substantially exposed to said environmental condition being sensed.

19. The device of claim 18, wherein said at least one environmental sensing component comprises an acoustic sensing component and/or a temperature sensor, and wherein said user-facing outer surface is configured with a grill member that exposes said at least one environmental sensing component to ambient air while substantially concealing said at least one environmental sensing component from user view.

20. The device of claim 15, wherein said user-facing outer surface provides a darker background against which one or more of said plurality of display elements is highlighted.

* * * * *